US012492788B2

(12) United States Patent
Spiro

(10) Patent No.: US 12,492,788 B2
(45) Date of Patent: Dec. 9, 2025

(54) DELTA LUMINAIRE—PHOTOVOLTAIC POWERED ROADWAY AND AREA LIGHTING LUMINAIRE

(71) Applicant: Exposure Illumination Architects, Inc., Scottsdale, AZ (US)

(72) Inventor: Daniel S. Spiro, Scottsdale, AZ (US)

(73) Assignee: EXPOSURE ILLUMINATION ARCHITECTS, INC., Scottsdale, AZ (US)

( * ) Notice: Subject to any disclaimer, the term of this patent is extended or adjusted under 35 U.S.C. 154(b) by 67 days.

(21) Appl. No.: 18/227,360

(22) Filed: Jul. 28, 2023

(65) Prior Publication Data

US 2025/0003562 A1 Jan. 2, 2025

Related U.S. Application Data

(60) Provisional application No. 63/524,432, filed on Jun. 30, 2023.

(51) Int. Cl.

| | |
|---|---|
| ***F21S 8/08*** | (2006.01) |
| ***F21S 9/03*** | (2006.01) |
| ***F21V 17/06*** | (2006.01) |
| ***F21V 19/00*** | (2006.01) |
| ***F21V 21/108*** | (2006.01) |
| ***F21V 23/00*** | (2015.01) |
| ***F21W 131/103*** | (2006.01) |

(52) U.S. Cl.
CPC ............... *F21S 8/086* (2013.01); *F21S 9/035* (2013.01); *F21S 9/037* (2013.01); *F21V 17/06* (2013.01); *F21V 19/0015* (2013.01); *F21V 21/108* (2013.01); *F21V 23/002* (2013.01); *F21S 8/085* (2013.01); *F21S 8/088* (2013.01); *F21S 9/03* (2013.01); *F21W 2131/103* (2013.01)

(58) Field of Classification Search
CPC .... F21S 9/03; F21S 9/035; F21S 9/037; F21S 8/085; F21S 8/086; F21S 8/088; F21V 21/26; F21V 21/28; F21V 21/29; F21V 21/30; F21W 2131/103
See application file for complete search history.

(56) References Cited

U.S. PATENT DOCUMENTS

| | | | | |
|---|---|---|---|---|
| 9,752,767 | B1 * | 9/2017 | Moghal | F21V 29/74 |
| 9,939,143 | B2 | 4/2018 | Spiro | |
| 10,677,446 | B2 | 6/2020 | Spiro | |
| D917,089 | S * | 4/2021 | Rajasekaran | F21S 2/005 D26/2 |

(Continued)

FOREIGN PATENT DOCUMENTS

| | | | |
|---|---|---|---|
| CN | 105674174 A * | 6/2016 | |
| CN | 108895398 A * | 11/2018 | F21S 8/088 |

(Continued)

OTHER PUBLICATIONS

Machine translation of CN 105674174 A retrieved from the FIT database of PE2E search. (Year: 2024).*

(Continued)

*Primary Examiner* — Colin J Cattanach
(74) *Attorney, Agent, or Firm* — XSENSUS LLP

(57) ABSTRACT

A modular, low profiled, scalable, self-powered integrated structure luminaire is coupled electromechanically to a vertical structure that supports a power storage device.

29 Claims, 14 Drawing Sheets

(56) References Cited

U.S. PATENT DOCUMENTS

| | | | | |
|---|---|---|---|---|
| 11,365,854 | B1 * | 6/2022 | Rajasekaran | F21V 21/0824 |
| 2009/0073689 | A1 * | 3/2009 | Patrick | F21V 14/02 362/373 |
| 2010/0029268 | A1 | 2/2010 | Myer et al. | |
| 2014/0218944 | A1 * | 8/2014 | Hobson | F21V 15/013 362/418 |
| 2021/0278071 | A1 * | 9/2021 | Tiefel | F21S 2/005 |
| 2022/0034497 | A1 | 2/2022 | Spiro | |

FOREIGN PATENT DOCUMENTS

| | | | |
|---|---|---|---|
| CN | 113639232 | A * | 11/2021 |
| EP | 3327347 | A1 | 5/2018 |

OTHER PUBLICATIONS

Machine translation of CN 113639232 A retrieved from the FIT database of PE2E search. (Year: 2024).*

Machine translation of CN 108895398 A retrieved from the FIT database of PE2E search. (Year: 2025).*

International Search Report and Written Opinion mailed on Oct. 15, 2024, in corresponding PCT/IB2024/056212, 19 pages.

* cited by examiner

DELTA LUMINAIRE—PHOTOVOLTAIC POWERED ROADWAY AND AREA LIGHTING LUMINAIRE

CROSS-REFERENCE TO RELATED APPLICATION

The present application claims the benefit of the earlier filing date of U.S. provisional application 63/524,432, filed Jun. 30, 2023, the entire contents of which being incorporated herein by reference.

BACKGROUND

Technical Field

The present disclosure relates to a self-powered roadway luminaire using photovoltaics (PV).

Discussion of Background

The following description of the BACKGROUND includes new observations and insights made by the present inventor regarding the state of the art in area lighting luminaires, and thus these observations and insights should not be construed as admitted prior art.

Roadway and area lighting luminaires are commonly coupled to poles (i.e., vertical structures that are able to host another component, such as a luminaire, at an elevated height). Within the urban fabric, roadway and area lighting poles are spaced apart from one another, with the luminaires providing the illumination light levels in accordance with the design intent. The lighting designer configures the needed lighting parameters by assessing the pole location, height, pole spacing, available luminaire type, the light level, and the uniformity ratio/s mandated. In municipal, county, state and federal right of ways, the specifications are mandated by a governing entity.

LED (Light Emitting Diode) is the current lighting industry choice for roadway and area lighting luminaires. A pole mounted LED luminaire, with its power supply driving the luminaire's light source (the driver), consumes electrical power. The power can be delivered by tapping into an urban power provider grid and/or can be locally generated by a power generating device coupled to a pole and/or installed in the vicinity of the pole. Presently, locally generated photovoltaic (PV) power is becoming increasingly affordable.

The PV technology harnesses the sun's electromagnetic photonic radiation and converts the energy to electrical power. The technology's key elements include: the PV panels, the power converter, and the power storage that stores the generated power until it is needed. The electricity generated can be stored, transmitted to a power consuming device, and/or conveyed to a remote power grid. To optimize power usage, it is a common practice to transmit daytime generated PV power to a remote user/s through the grid and at nighttime, when cost of power is lower, to return at least a part of the power transmitted to the pole mounted luminaire/s. (In the present document the convention "xxx/s" is shorthand notation for "one or more" and thus should be construed as singular or plural).

The PV panel/s of a self-power generating light pole is configured to collect solar energy from the sun, convert the solar energy into electricity, and use the electricity to provide electrical power to a LED light source that illuminates a surface area below at night. To capture maximum sun energy, the PV panel/s is typically tilted toward an optimal sun orbit. The PV panel tilt angle is commonly configured for wintertime when day length is shortened, and the sun is low in the sky. Aiming to capture maximum solar energy when solar energy is scarce, the wintertime tilt angle of the PV panel in the northern latitudes is required to be high. However, the PV panel may be hosted on a gimbaled mount that allows for active (e.g., via a stepper motor) repositioning of the PV panel to maximize solar energy collection throughout the day.

The PV cells' surface area is sized to correspond to the anticipated power demand and the demand duration. To avoid masking the light emitted by the luminaire powered by PV panel/s, in at least one embodiment of the present disclosure, the PV panel/s is disposed above the light source of the luminaire.

High tilt mounting angle of the PV panel has intrinsic benefits—it prevents snow/ice accumulation, and habitation by birds. However, coupled to a pole, the high tilt mounting angle has two major disadvantages. First, when tilting the PV panels toward the sun, wind loads on the pole increase, necessitating stronger poles and support structure. Stronger poles require stronger foundations, adding costs to the pole assembly. Second, since the placement of the PV panels is contingent on the sun's orbit, the placement of the PV panels in relation to the light source power appears architecturally disjointed. Further, aside from the pole with the coupled luminaire and the PV panel/s, it is common practice to haphazardly couple a myriad of parasitic electrical devices, further contributing to an urban eyesore.

The pole mounted PV panel/s is positioned to capture maximum energy from the sun. As the surface temperature of the sun facing PV panel exceeds 95° C., the power generation capacity of the panel is reduced. For this reason, the panel's tilt angle and orientation are configured for the time of the year when the day hours are short. Nonetheless, maintaining the surface temperature of the PV panel/s below the threshold temperature is always desired.

The PV power generated by the sun during daylight hours is configured to be consumed by the light source and/or other power consuming devices at night. In configuring a lighting layout, the lighting designer sizes the PV panel/s capable of generating sufficient power to maintain the light source and/or the other coupled devices to the pole through the required duration of the night. In at least one embodiment, the sensing device coupled to the luminaire and/or the pole turn the light on when the sensing device senses an activity. Otherwise, the light is turned on/off by a control signal (triggered by time, and/or time of day) and/or a photocell (triggered by light level).

When an external power grid is in the vicinity, an alternate power management method can be used. The power generated by the pole coupled PV panel/s can be distributed through the grid to a remote device, and at night a portion or all of the power generated can be drawn back from the grid. While requiring additional equipment such as metering and communication devices, this power management method can over time generate a positive return on investment, as the cost of energy is higher during the day. Also, this method may require a smaller power storage device, thus reducing the assembly's installed cost.

The power generated by the PV panels can be stored by a power storage device that is also coupled to the pole. The power generated by photovoltaic cells is converted between DC and AC power. The power conversion device is commonly housed in proximity to the power storage device. The power storage device with the power conversion device housing is typically coupled to the pole in proximity to the PV panel/s. Placement of said housing above the mid-point of the pole height, while common, is undesirable as the housing with its content is rather heavy, inducing additional stresses on the pole.

Present-day pole mounted roadway and area lighting luminaire/s powered by PV panels today is driven by power efficiency and cost. Often, the elements comprising the pole assembly can be designed, supplied, and/or installed by different parties. As a result, often there is no placement hierarchy for the short- and long-lived electrical devices on the pole, the arm, and the luminaire. The PV self-powered pole assembly with light source long-lived devices can include at least one of: a solar panel, a light source, and a driver. The short-lived devices can include at least one of: a power storage device, and a processing/controlling device (programmable circuitry, and/or hardwired circuitry, such as programmable array logic).

As recognized by the present inventor, key shortcomings of the present pole mounted roadway and area lighting luminaires powered by PV panel/s art include:

- Loading the pole's higher section with heavy and voluminous structure/s translates to costly pole and foundation and expensive up-keep.
- Failing to place short-lived electronic devices at the lower section of the pole translates to costly up-keep.
- Absence of means to reduce the surface temperature of the PV panel during the hot summer months adversely affecting the panel's power generating capacity.
- Placement of the PV panel and other system components at the most power efficient and inexpensive location on the pole, arm, and luminaire results in creating an urban eyesore.

The present innovation seamlessly integrates the PV technology with light source technology, creating novel architectural and engineered solutions for roadway and area illumination.

SUMMARY

According to an aspect of the present disclosure, a new self-powered roadway luminaire using PV is described.

To overcome the limitations of conventional devices and systems as discussed above, the present innovation redistributes the system elements of the self-powered by PV technology roadway and area lighting luminaire. The five governing design considerations for the system elements re-distribution include:

(1) A system that comprises a pole, power inversion unit, a storage device that is coupled to the pole, and a luminaire housing structure that integrates a light source with a PV panel, wherein the placement of the elements is based on the element's form factor, weight, device life expectancy, ease of serviceability and first and life cycle costs.

(2) Horizontal or substantially horizontal PV panel placement.

(3) Luminaire form and capability to scale up to support different PV panel sizes and light source power input.

(4) Day and nighttime utilization of heat generated by the PV panel, and electronic device/s to reduce and/or control the devices coupled to the luminaire temperature.

(5) Luminaire device integration ability to support sensing, communication, monitoring, and processing devices with local and remote connectivity.

The redistribution of the PV system's elements separates the long-lived devices from the short-lived devices. The PV system's short-lived devices are typically heavy, and their enclosure is voluminous. Therefore, to reduce initial material and labor cost and subsequently maintenance costs, the present innovation places these devices below the mid-height of the pole. Where possible, it places this device in proximity to grade level.

Departing from the convention of tilting the PV panel toward optimal power generating sun angle, the present innovation proposes that ample power can be generated by positioning the PV panel/s substantially horizontally, compensating for the efficiency loss by increasing the PV surface area. The cost of the PV panels is reduced year by year, while the PV panel's efficiency increases year by year.

Integrating PV panels with roadway and area lighting luminaires demands a luminaire form factor that can accommodate different size PV panels without having to change the luminaire size. The present innovation solves this problem by introducing the Delta luminaire housing form. The Delta luminaire housing form couples to a pole at one end and at the other end can expand outwardly. The luminaire expansion can be done without encroaching on a neighboring luminaire/s. Further, in at least one embodiment a Delta luminaire pole arrangement induces a stream of air to flow through openings between the luminaire and the pole cooling the luminaire's warmed elements. The Delta luminaire form is planar, light weight with the PV panels coupled to a housing structure from above, and the luminaire's light source and other electronic devices coupled to the housing structure from below.

During daylight hours the Delta luminaire harnesses the heat generated by the PV panel to cool the PV panel/s and the at least the luminaire electrical devices. At night the delta luminaire extracts the heat generated by the at least the luminaire's electrical devices wherein the PV panel can help absorb and dissipate the heat. During winter months, the Delta luminaire electrical devices can help melt ice and snow accumulation on the PV panel. The thermal management attribute of the Delta luminaire results from the system's mechanical and electrical elements arrangement and thermal interdependency between them. For this reason, the PV panel and the luminaire are in proximity to one another, and both are coupled to an integrated housing structure.

The integrated housing structure of the Delta luminaire comprises a central elongated enclosure that extends diagonally across the bottom side of a square or rectangular frame. Structural support ribs extend outwardly and perpendicular from the elongated enclosure couple the elongated enclosure to the frame. In at least one embodiment, the elongated enclosure can extend beyond the frame and can become the Delta luminaire arm.

The Delta luminaire housing structure is configured to receive the PV panel from above and to couple to a plurality of electronic devices primarily from below. Among the devices coupled from below, several devices can be disposed inside compartments in the central elongated enclosure, while others can be coupled to the central elongated enclosure and/or the underside of the PV panel and the ribbed support structure.

The Delta luminaire has optional built-in provisions to address climatic conditions that can adversely impact the power generation capacity of the coupled photovoltaic panel. The provisions are geared to address ice/snow and dust accumulation. These provisions can rely on thermally passive and/or non-passive cooling/heating devices to remove ice/snow accumulation, and on fixed or mobile devices to remove dust accumulation from the Delta PV panel.

The devices coupled to the Delta luminaire can include at least one of, power supply, power conversion, a communication device, a sensing device, a processing device with resident memory and code. The code can embody at least one AI algorithm giving the Delta luminaire processor the ability to monitor and make actionable decisions based on sensory input, embedded operational parameters, and remote input. In addition, and for example, the Delta luminaire housing with or without the PV panel and the light source, can host a UAV and utilize the top surface as a launch pad and/or power/signal docking station.

Lastly yet importantly, the pole mounted Delta luminaire's modularity and scalability can become a base platform for an urban power generation grid. The existing street lighting poles with existing luminaires or newly installed can employ at least one Delta luminaire and a plurality of Delta luminaire housing structures, each coupled to a PV panel. The cumulative power generated by the PV panels' assembly can exceed the power needed to power the luminaire. The excess power can be transmitted directly to the local grid, reducing the dependency on remotely generated power.

In at least one power management configuration, the power generated during the day can be directly transmitted to the local grid, while at night, when power rate is lower, at least a portion of the power can be transmitted back to energize the coupled luminaire. It is noted that based on the following assumptions: a city with 10,000 roadway poles, each pole with 36 sq.-ft PV panels, 15 W/Hr. power generation capacity, 8 hrs./day of power generation cycle and 360 days/year, 15.55 million kWh can be generated. Further, the increased shaded surface area of approximately 8.5 acres will help reduce the urban heat island effect.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8A shows externally coupled electrical devices and FIG. 8B shows the interior enclosure/s of the driver's housing of the delta luminaire.

FIG. 10C is mobile.

FIGS. 11A and 11B show front and top views respectively, FIGS. 11C and 11D show a transverse section and a longitudinal section respectively, and FIG. 11E is similar to FIG. 11A but shows a textured surface with at least one of a recess and a protrusion.

DETAILED DESCRIPTION

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

Figures 1A, 1B, 1C, 1D, 1E:
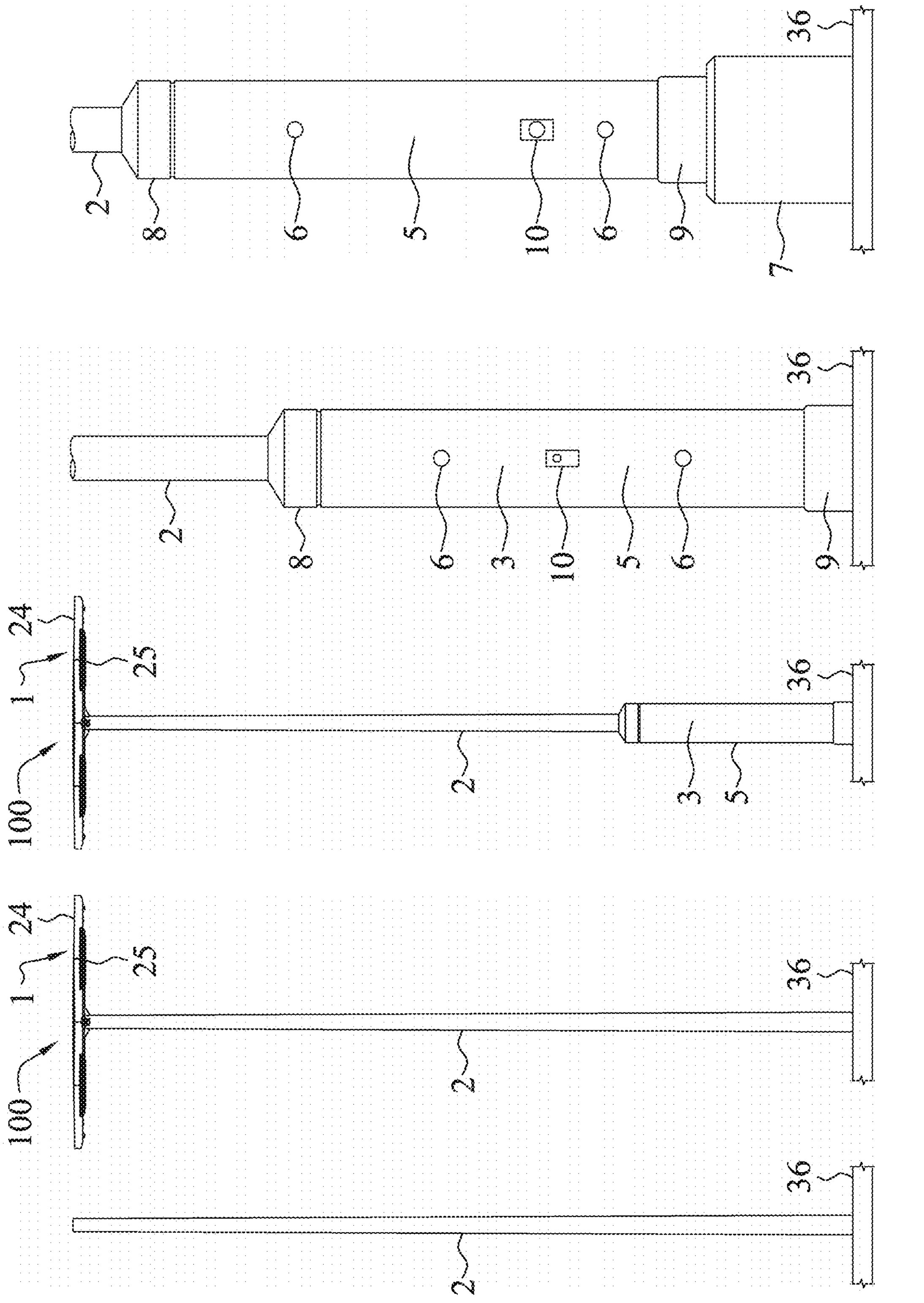
FIGS. 1A, 1B, and 1C show main elements of the pole mounted Delta luminaire.
FIGS. 1D and 1E shows an exemplary partial elevation of a base of the pole.
Figures 2A, 2B, 2C, 2D, 2E, 2F, 2G, 2H:
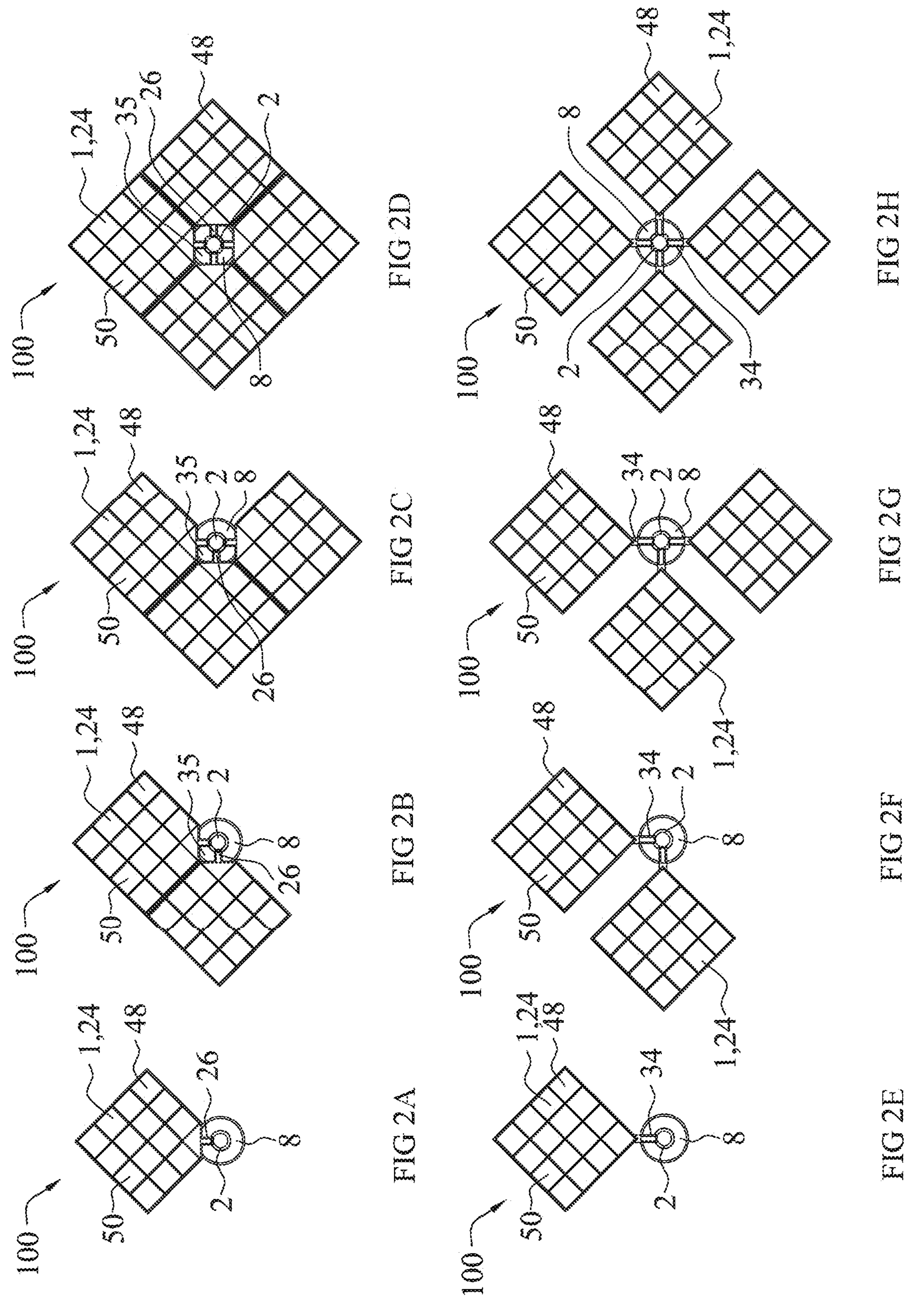
FIGS. 2A, 2B, 2C, and 2D show respective 1, 2, 3, and 4 pole mounted truncated Delta luminaire arrangements.
FIGS. 2E, 2F, 2G, and 2H show respective 1, 2, 3, and 4 pole mounted extended arm Delta luminaire arrangements.

FIGS. 1A, 1B, and 1C show main key elements of the pole mounted Delta luminaire. FIG. 1D shows an exemplary partial elevation of the pole's base.

FIG. 1A shows a pole 2. The pole 2 can be made of metallic material, non-metallic material or a combination of the two. The pole 2 can be embedded in the ground 36 or can be resting on a pole plate and coupled to a foundation 7 (FIG. 1E) with anchor bolts. The pole 2 can be straight-shafted or tapered. The pole profile can be square, round, or segmented. The pole 2 can comprise at least one section and can have recesses and/or protrusions extending inward or outward from its surface. The pole 2 can also have at least one bore 41 to mechanically couple an external device and/or to convey power/data conductor/s 40 to and/or from the pole's 2 interior.

FIG. 1B shows a plurality of Delta luminaires 100, 1 coupled to the pole 2 top. Two of the luminaires 1 shown extend sideways and the center luminaire 1 extends toward the viewer. A PV panel 24 is coupled to the luminaire 1 on top, and a light source 25 is coupled to the luminaire's bottom. The assembly of the Delta luminaires 100, 1 are shown to slope down as they extend outwardly from the pole 2. The slope removes fluid from ponding on the coupled PV panels 24. In winter, heating devices 29, 30 built into the Delta luminaire 1 housing structure 50 can prevent snow/ice accumulation over the PV panel 24, shedding away the melted ice/snow water.

FIG. 1C shows a pole 2 mounted luminaire assembly 100 comprising a pole 2 coupled to a plurality of Delta luminaires 1 with a PV device enclosure 5 located around the pole 2 at the base of the pole's 2. Also shown a PV panel 24 coupled to the luminaires 1 on top, and a light source 25 coupled to the luminaire's bottom. The PV device enclosure 5 can, at least in part, house at least one of a short-lived device, a heavy device, and a bulky device of the PV power generation system. In addition, other devices can be coupled to the PV power enclosure 5, serving related and/or unrelated services associated with the self PV power generated roadway and area lighting pole 2 mounted system.

FIG. 1D shows an enlargement of the pole's base surrounded by the PV device enclosure 5. There are several reasons to place the short-lived, heavy, and bulky devices at the lower half of the pole 2. These reasons include:

- The higher these devices are placed on the pole, the stronger the pole and foundation required.
- The shorter the life of the device, the more frequent maintenance the device requires.
- Having the device mounted at easily accessible height saves machine and laborer costs.

Other than the PV power generating devices retained inside the enclosure housing, other non-related devices can be retained inside or coupled to the enclosure housing. For example, an enclosure for a pole positioned by a crosswalk can also have a sensing device switching the traffic light when sensing occupancy.

The devices coupled to the PV device enclosure 5 and/or the pole 2 partially or fully surrounded by the PV device enclosure 5 with the power storage and control unit 3 concealed inside. The elements of the power storage and control unit 3 can include at least one of, an inverter 4, a battery 46, a power management controller 47, a fuse 52, a power disconnect 49, a sensing device 10, and a communication device 11. The battery/s 46 can be positioned at the opposite side of pole 2 that faces the sun much of the year. The interior of the PV device enclosure 5 can include at least one of, a thermal blanket 29, and a heat reflecting and non-conductive pad 51. Such accessories can be coupled to the PV device enclosure 5 based on the climatic conditions at the installation's location.

The PV device enclosure 5 can include a lock 6. The lock 6 can be a digital code lock that bars entry to the PV device enclosure's 5 interior. A sensing device 10 can couple to the exterior surface of the PV device enclosure 5. When a pole mounted luminaire assembly 100 is placed in proximity to a crosswalk, the coupled sensing device 10 can help control the pedestrian and vehicular traffic at the crosswalk.

PV device enclosure 5 can be elevated from the ground 36 to avoid contact with run-off water. A power storage and control unit base shown elevated the PV device enclosure 5 from the ground 36 and a power and control cap 8 protects the interior of the enclosure 5 from moisture penetration from above. The PV device enclosure 5 can be formed to complement the architecture of the pole 2 assembly. The PV device enclosure 5 material can be made of metallic material, non-metallic material, non-corrosive material, non-conductive material, and/or non-flammable material.

FIG. 1E shows the PV device enclosure 5 of FIG. 1D elevated and resting on a concrete base 7.

FIGS. 2A, 2B, 2C and 2D show 1, 2, 3 and 4 pole mounted truncated arm 26 Delta luminaire assembly 100. The truncated arm 26 Delta luminaire 1 is primarily suited for area lighting and/or where there is a need to generate more power requiring more PV panel 24 surface area. The surface area of the PV panel 24 is comprised of a plurality of sub-panels 48 modules. The Delta formed housing structure 50 can support other power consuming devices. For example, the top surface of the Delta formed housing structure 55 can become a launching pad and/or an electrified docking station for an unmanned arial vehicle (UAV, not shown).

When a plurality of truncated arm 26 Delta luminaires 1 are coupled to a pole 2 from all sides, a through air opening 35 forms between the pole 2, the Delta luminaires 1, and the luminaire's arm 26. As the temperature, coupled from above PV panel's, rises during daytime operation, cool air from below the Delta luminaires 1 is induced to flow through the through-air openings 35 to above. The flow of air employing the chimney and Venturi effects cools the underside of the Delta luminaires 1 with its coupled electrical devices 55.

FIGS. 2E, 2F, 2G, and 2H respectively show 1, 2, 3, and 4 pole mounted extended arm 34 Delta luminaire 1 arrangements. The Delta luminaire 1 with extended arm 34 is primarily suited for roadway applications where a single luminaire illuminates a segment of the road. The Delta luminaire 1 extended arm 34 can be an extension of the elongated enclosure 19 (not shown) that forms the spine of the luminaire 1. The extended arm 34 Delta luminaire 1 extends outwardly to form an air gap between two adjacent luminaires. The extended arm 34 exposes a single or a Delta luminaire 1 assembly to cooling flow of air from below from all sides.

Figures 3A, 3B, 3C, 3D, 3E, 3F:
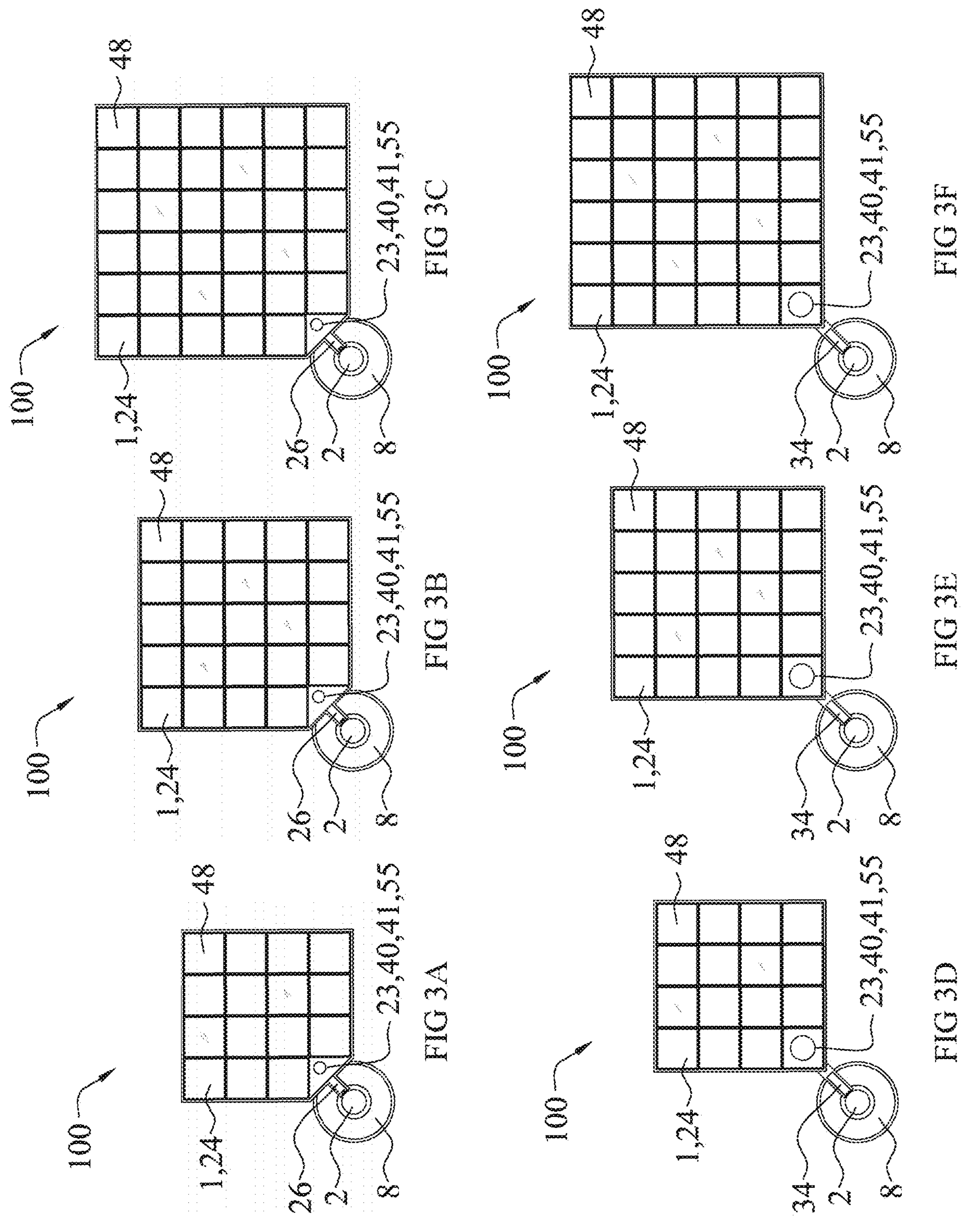
FIGS. 3A, 3B, and 3C show three truncated Delta luminaires with 15, 24, and 35 photovoltaic panels respectively.
FIGS. 3D, 3E, and 3F show three extended arm Delta luminaires with 4×4, 5×5, and 6×6 photovoltaic panels respectively.

FIGS. 3A, 3B, and 3C show three pole assemblies 100 with truncated arm 26 Delta luminaires 1. The Delta luminaires 1 shows an arrangement of 15, 24, and 35 photovoltaic sub-panel 48 modules. The triangular area by the truncated arm 26 of the Delta luminaire 1 can be coupled to at least one of, a triangular sub-panel 48, an electrical receptacle 23, and an up facing electrical device 55. The area by the truncated arm 26 end can also provide an access bore 41 for at least one electrical conductor's 40 connectivity to the interior of the elongated enclosure 19. The frame 20 walls by the triangular area can be reinforced to enable elongated fasteners 53 to couple the Delta luminaire's 1 truncated arm 26 to a pole 2. The truncated arm 26 Delta luminaire 1 retains a PV panel 24. The PV panel's 24 size is scalable and can expand beyond the number of sub-panels 48 shown.

FIGS. 3D, 3E, and 3F show three extended arm 34 Delta luminaires 1 with 4×4, 5×5, and 6×6 photovoltaic sub-panels 48. The extended arm 34 Delta luminaire 1 has a square form with a grid comprising an equal number of photovoltaic sub-panels 48 within the frame 20 walls. The extended arm 34 length can be designed for any length and can be fabricated unitarily with the elongated enclosure 19 that forms the spine of the Delta luminaire 1. As with the truncated arm 26 of the Delta luminaire 1, at least a portion of the top surface of the Delta luminaire 1 can be coupled to at least one of, an up facing electrical device 55, and an electrical receptacle 23. The extended arm's 34 end can also have an access bore 41 for at least one electrical conductor's 40 connectivity to the interior of the elongated enclosure 19.

Figure 4B:
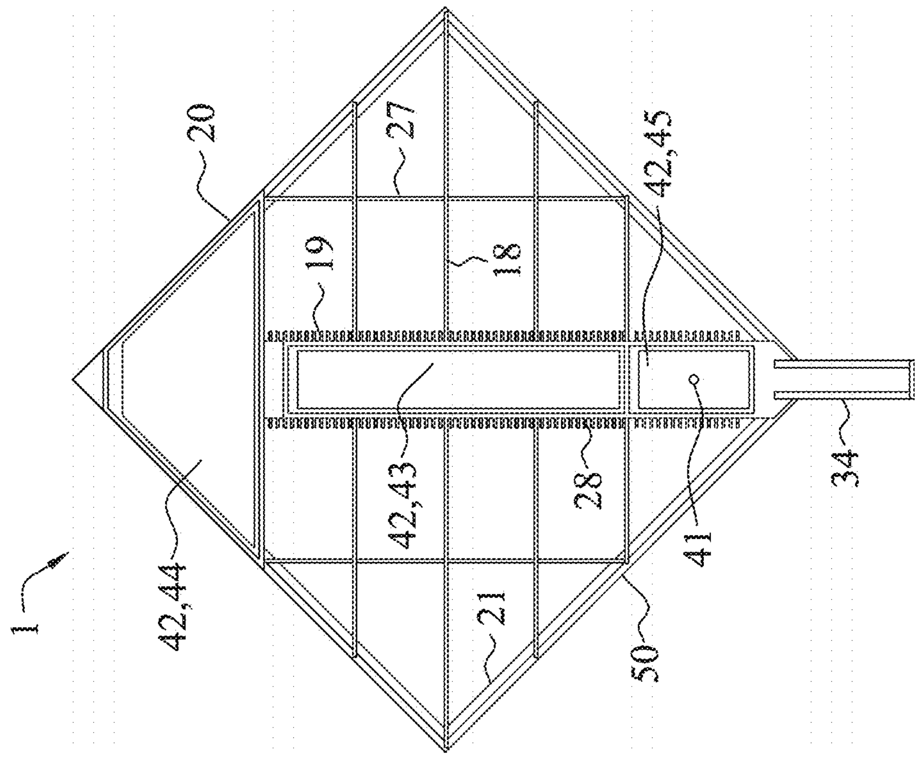
FIGS. 4A and 4B show top views of the integrated Delta luminaire housing structure, which FIG. 4A showing the truncated Delta luminaire and FIG. 4B showing the extended arm Delta luminaire.
Figure 4A:
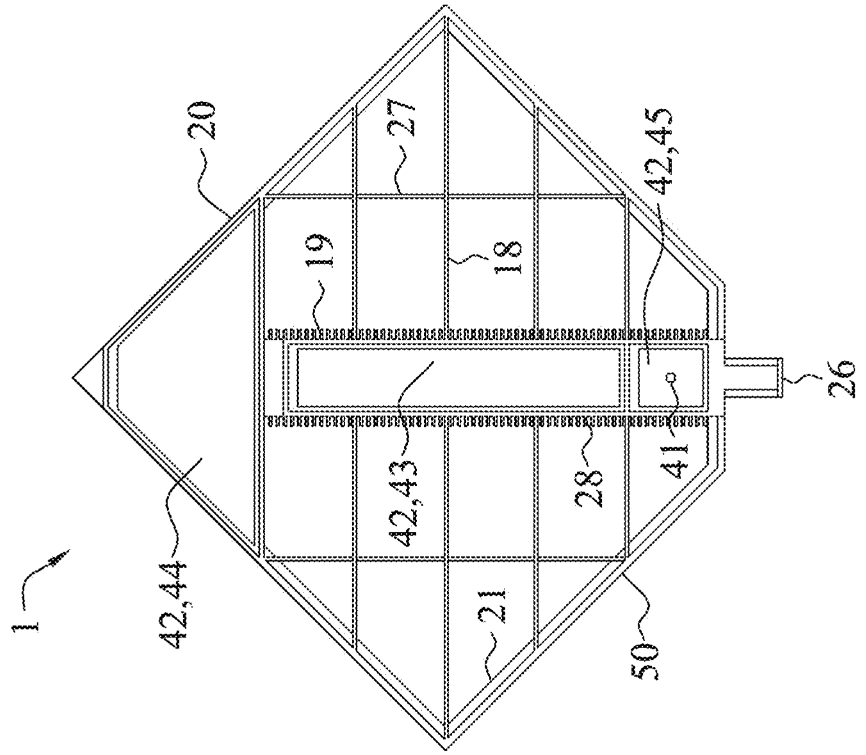

FIGS. 4A and 4B show ground facing views of the integrated Delta luminaire 1 housing structure 50 with FIG. 4A showing a truncated arm 26 and FIG. 4B showing an extended arm 34. For clarity, the figures show the elongated enclosure 19 of the housing structure 50 without coupled covers 37, 38, and 39 (not shown). The elongated enclosure 19 supports the luminaire's 1 structure with its coupled devices. Also, for clarity, the present figures do not show electrical devices and PV related elements. For a more complete depiction, refer to FIGS. 6A-6D and 8A-8B.

The elements of the Delta luminaire 1 housing structure 50 as seen from below include a central elongated enclosure 19 that extends diagonally across the bottom side of a squared or substantially squared frame 20. The elongated enclosure 19 is also referred to herein as the spine. The Delta luminaire's 1 elongated structure 19 couples to an arm. The arm can be a truncated arm 26 or an expanded arm 34. Both arms can be unitarily fabricated with the Delta luminaire 1 housing structure 50. The truncated arm's 26 connectivity to the luminaire's 1 housing structure 50 differs from the extended arm 34 Delta luminaire 1. Elsewhere, the luminaire's housing structure 50 can be substantially or entirely the same.

The elongated enclosure 19 has at least one compartment 42. The present figures show three compartments 42-*a* power supply compartment 43 in the center, a splice box compartment 45 coupled to the arm, and a device enclosure 44 at the opposite end of the elongated enclosure 19. The elongated enclosure 19 compartments 42 can have at least one of, a through bore 41 to enable conveyance of power/data conductor/s and a venting aperture for warm air to exit the enclosure 42.

The power supply compartment 42, 43 can retain at least one power supply 22 (not shown) and can be enclosed by a power supply cover 38 (not shown). The power supply cover 38 can be secured to the elongated enclosure 19 with a mechanical fastener 31 (not shown). At the other end, the power supply cover 38 can be coupled to the elongated enclosure 19 with a hinge 57 (not shown). The power supply cover 38 can be detachable. The exterior facing side of the power supply cover retains the light source 25 (not shown) with a protective lens 32 (not shown). The power supply cover 38 can also become a heat sink. The size of the power supply cover 38 can expand as needed to accommodate the light output demand on the luminaire 1.

The elongated enclosure 19 couples at the arm's 26, 34 side to a compartment 42 that is the luminaire's splice box 45. As with the power supply compartment 43, the splice box 45 can be enclosed by a splice box cover 37 (not shown). At least one bore in a wall of the splice box compartment 45 with a through power/data conductor can convey power/signal to and from the splice box compartment 45. The present figure shows a bore 41 at the roof of the splice box 45.

At the opposite side of arms 26, 34, the elongated enclosure 19 can expand, forming a triangular compartment 42. The compartment 42 can be enclosed by device tray 39 (not shown). The expanded area of the compartment 42 with the device tray 39 is suitable for coupling a plurality of electrical devices 55. The devices that can couple to the device tray 39 (not shown) can include at least one of, a sensing device 10, a communication device 11, and a processing device 12. The devices coupled can be operationally unrelated, or related in part, to the operation of the coupled Delta luminaire 1.

Structural support ribs 18 incrementally extend outwardly and perpendicularly from the elongated enclosure 19 and couple the elongated enclosure 19 to the frame 20. The ribs 18 can extend above the elongated enclosure 19 creating a through air gap 33 (not shown) between the PV panel's 24 (not shown) bottom, side, and top surfaces of the elongated enclosure 19. Stiffeners 27 perpendicularly coupled to the ribs 18 can provide additional rigidity to the Delta luminaire 1 structure. At least one of, a lip 21 coupled to the inner walls of the frame 20, a rib 18, and a stiffener 27 can support the weight of the PV panel 24 that is coupled to the housing structure 50 from the above.

Fins 28 that extend outwardly from the elongated enclosure 19 spine of the Delta luminaire 1 dissipate heat generated by at least one electrical device 55 that is coupled to the elongated enclosure 19. The fins 28 can be unitarily coupled to the elongated enclosure 19 and can extend a portion or the full length of the elongated enclosure 19.

Other aspects of the present figures not shown include:

Both the truncated arm 26 and the extended arm 34 Delta luminaires 1 can have at least one electrical or an electrical and data receptacle 23 on the top surface of the elongated enclosure 19. Such a receptacle 23 can couple to a reciprocating receptacle 23 coupled to the back side of the PV panel 24. Once the PV panel 24 is secured in place, electricity can flow from the PV 24 panel into the elongated enclosure 19. Power and/or data conductor from the top of the Delta luminaire 1 housing structure 50 can enter the splice box 45 of the elongated enclosure 19 through bore 41.

Thermal conductors 30 extending from inside the elongated enclosure 19 can be placed on top of at least one rib 18 that is in contact with the bottom side of the PV panel 24. During the night when the light source 25 is on, heat generated by at least one of the light source 25 and a power supply 22 can be conducted through the conductor/s 30 to the bottom side of the PV panel 24. Especially during the summer nights, the removed heat prolongs the life of the Delta luminaire's 1 coupled electrical devices 55. In winter, when snow/ice can accumulate over the PV panel 24, the conductor/s 30 can help melt the snow/ice.

In cold environments "plug 'n play" receptacles 23 disposed at the top surface of the elongated enclosure 19 can couple to reciprocating receptacles 23 disposed at the bottom of the PV panel 24. The receptacles 23 coupled to the bottom of the PV panel 24 can be electrically coupled to electrical thermal blankets 29 that are secured to the bottom of the PV panel 24. By a signal from a remote location and/or by input from a coupled sensing device 10 (not shown), the electrical thermal blanket 29 can generate sufficient heat to melt any snow/ice accumulation on the top face of the PV panel 24.

The integrated Delta luminaire 1 housing structure 50 can be fabricated using metallic materials, non-metallic materials, or a combination of both. The housing structure can be fabricated by at least one process of: molding, casting, and 3D printing. The housing structure 50 can be made to be anti-corrosive, anti-flammable, and resistant to UV radiation. The housing structure 50 can be painted, anodized, or galvanized.

Figure 5A:
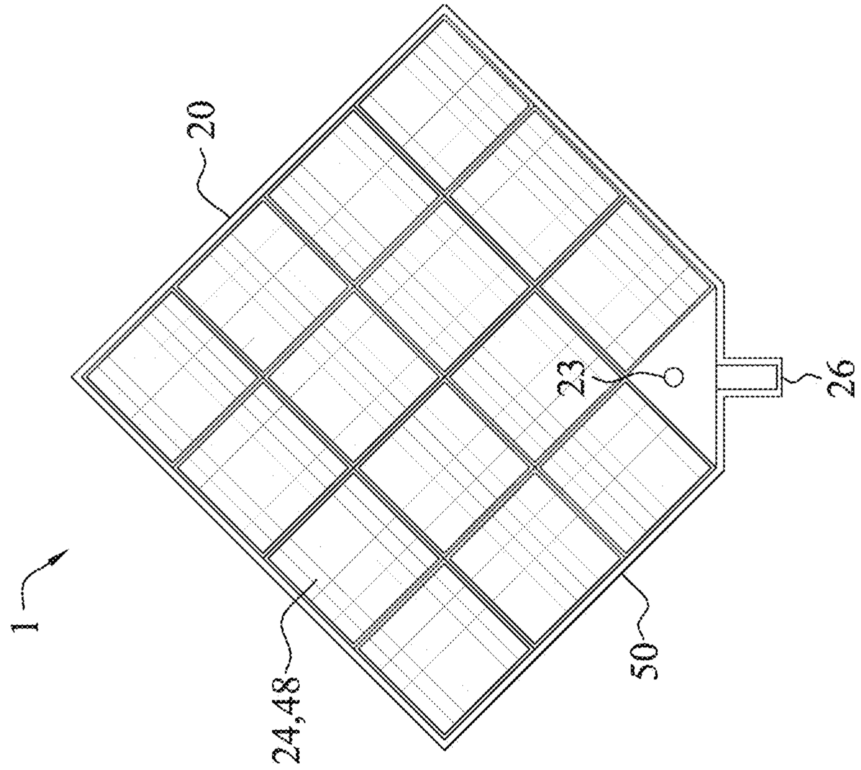
FIGS. 5A and 5B show bottom views of the integrated Delta luminaire housing structure, with FIG. 5A showing the truncated Delta luminaire and FIG. 5B showing the extended arm Delta luminaire.
Figure 5B:
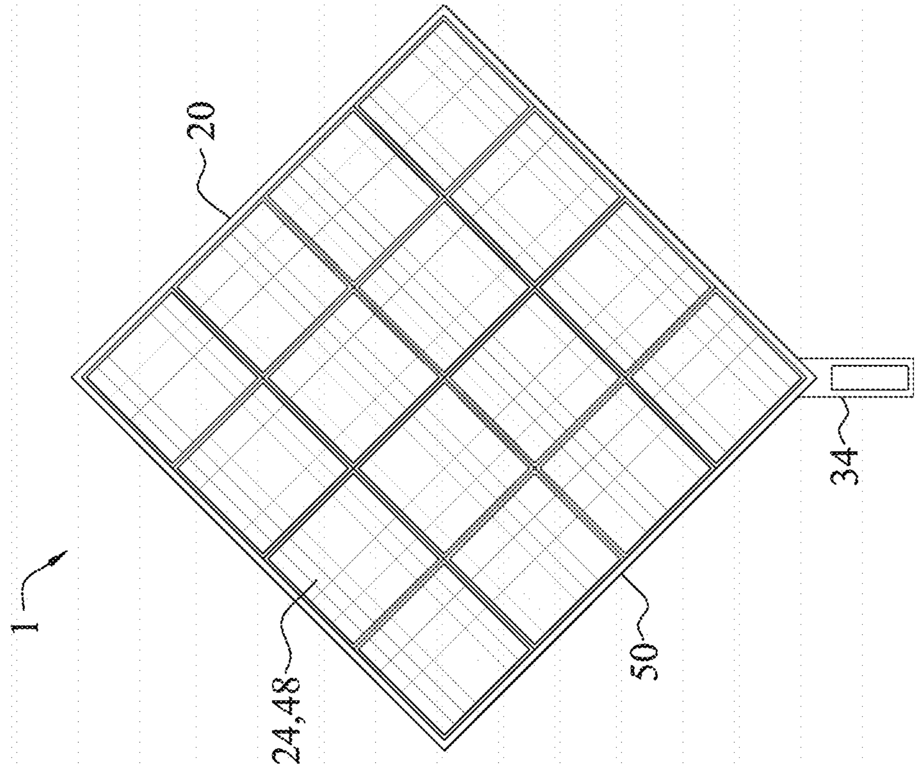

FIGS. 5A and 5B show the top views of the integrated Delta luminaire 1 housing structure 50. FIG. 5A shows the Delta luminaire 1 with a truncated arm 26 and FIG. 5B shows the Delta luminaire 1 with an elongated arm 34.

PV panels 24 divided by a grid of PV sub-panels 48 are shown secured from above to the housing structure 50 of the Delta luminaire 1. The PV panel 24, 48 is shown resting within the frame 20 walls of the housing structure 50. The Delta luminaire form slightly varies at the arm's end. The Delta luminaire 1 coupled to the truncated arm 26 form is truncated. The present figure shows an uncovered area by the PV panel 24, 48 with a receptacle 23 that can convey power and/or data to the interior of the elongated structure 19.

It is noted that the form of the Delta luminaire 1 coupled to a pole 2 can be scaled up. The need to scale up a Delta luminaire 1 is driven by a greater need for power generation. The form of the Delta luminaire 1 enables scaling up the luminaire with a corresponding PV panel 24, without a conflict with a neighboring coupled luminaire 1. The PV panel can be shipped to the construction site installed or be installed onsite.

The integrated Delta luminaire 1 housing structure 50 can be fabricated using metallic materials, non-metallic materials, or a combination of both. The housing structure can be fabricated by at least one process of: molding, casting, and 3D printing. The housing structure 50 can be made to be anti-corrosive, anti-flammable, and resistant to UV radiation. The housing structure 50 can be painted, anodized, or galvanized.

Figure 6A:
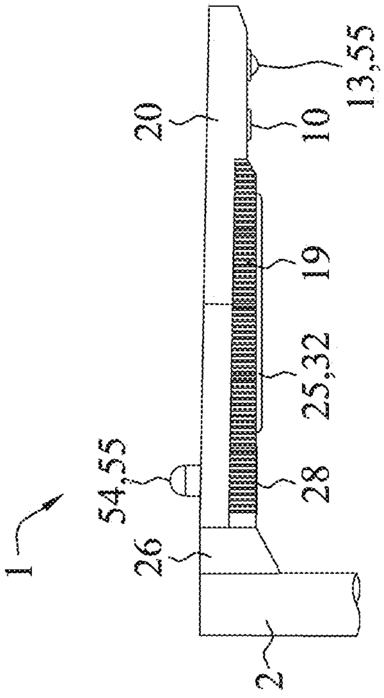
FIGS. 6A and 6B show side and frontal views of the truncated Delta luminaire coupled to a pole respectively.
Figure 6B:
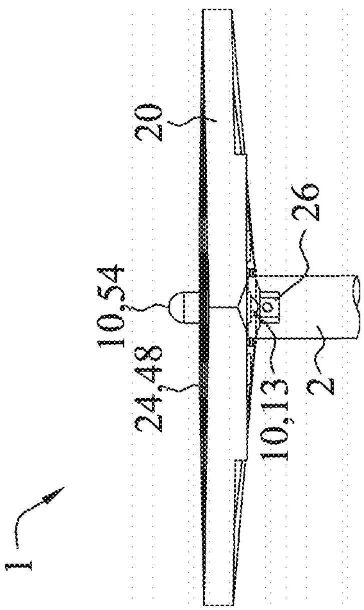
Figure 6C:
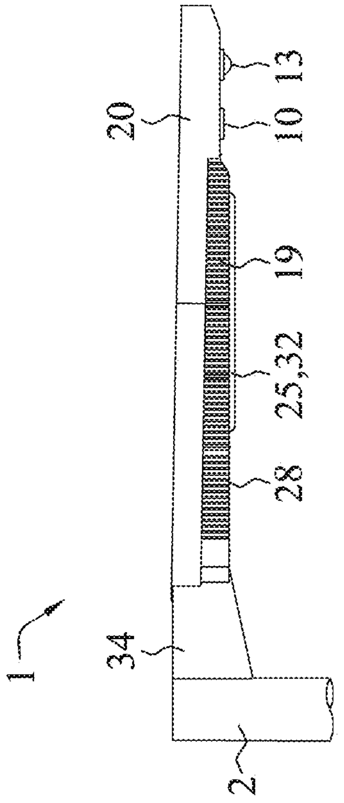
FIGS. 6C and 6D show side and frontal views of the extended arm Delta luminaire coupled to a pole respectively.
Figure 6D:
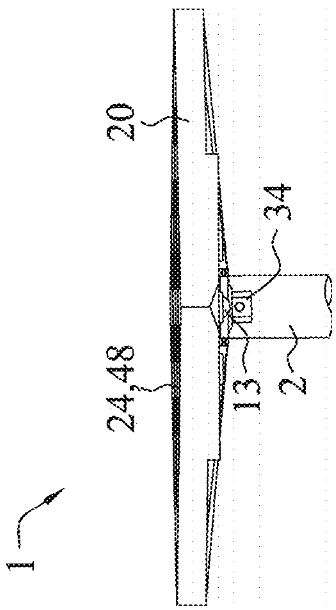

FIGS. 6A and 6B show the side and frontal views of the truncated Delta luminaire coupled to a pole. FIGS. 6C and 6D show the side and frontal views of the extended arm Delta luminaire coupled to a pole.

FIGS. 6A and 6B show the side and frontal views of the truncated arm 26 Delta luminaire 1 coupled to a pole 2. The Delta luminaire 1 is slimline, with a minimal Effective Projected Area (EPA). A lower EPA luminaire is subjected to lower wind loads. A lower wind load on the at least one luminaire shown coupled to a pole 2 reduces the cumulative lateral loads on the pole 2 which translate to a lighter pole 2 wall gauge and/or smaller pole 2 diameter. Lighter pole 2 gauge and/or smaller pole 2 diameter cost less.

FIG. 6A, the side view of the truncated arm 26 Delta luminaire 1, shows the protective frame 20 extending around the Delta luminaire 1. In at least one embodiment the frame 20 can merge or be formed to become the luminaire's 1 mounting arm 26 to the pole 2. The present embodiment shows a light source 25 horizontally coupled to the bottom of the elongated enclosure 19 of the luminaire 1. A lens 32 disposed over the light source 25, can emit light in a plurality of light distribution patterns. Heat dissipating fins 28 are shown coupled to the wall of the elongated enclosure 19.

The luminaire 1 at one end is shown coupled to a pole 2, and at the other end a plurality of electrical devices 55 are shown coupled to the bottom of the luminaire 1. The electrical devices 55 shown are coupled to a reduced depth portion of the elongated enclosure 19. Also, at the top of the luminaire 1 in proximity to the arm 26, a photocell 54 is shown coupled. In a different embodiment, at least one different electrical device 55 can be coupled to the top of the truncated arm 26 Delta luminaire 1 with a partial, full, or no PV panel 24 coverage on top of the luminaire 1.

The present embodiment shows the light source 25 coupled to the bottom of the elongated enclosure 19 mounted horizontally; however, the top of the luminaire 1 is shown sloping downward and away from the pole 2. The slope of the structure is intended to swiftly remove water from the face of the PV panel 24. The angle of the slope is relatively shallow, but sufficient to remove water with minimal impact on the PV panel's 24 power production efficiency.

FIG. 6B, the frontal view of the truncated arm 26 Delta luminaire 1, shows the luminaire's frame 20 protecting the electrical devices 55 coupled to the luminaire 1. PV panel 24 comprising a plurality of sub-panels 48 is shown disposed from above within the frame's 20 walls. The angled frame 20 diverts the wind to the side and away from the luminaire 1, further reducing the stress on the pole 2. In addition, the sloping downward luminaire 1 form, help direct lateral wind load down on to the pole 2. The elongated enclosure 19 coupled to the pole 2 at the opposite end cantilevers across the length of the luminaire 1, carrying the weight of the luminaire 1 with its coupled electrical devices 55 and/or mechanical devices.

The cantilevered elongated enclosure's depth is shown to vary, becoming shallower at the end opposite to the pole 2. Reducing the depth of the elongated enclosure 19 contributes to lesser EPA on the luminaire 1 and enables expanding the elongated enclosure's 19 device retainage area to support coupling a plurality of electrical devices 55. The present embodiment shows three electrical devices 55 coupled-two sensing devices 10, 13 and one communication device 11.

FIGS. 6C and 6D show the side and frontal views of the extended arm 34 Delta luminaire 1 coupled to a pole 2.

FIG. 6C, the side view of the extended arm 34 Delta luminaire 1, shows the protective frame 20 extending around the luminaire 1. The present embodiment shows a light source 25 horizontally coupled to the bottom of the elongated enclosure 19 of the luminaire 1. Heat dissipating fins 28 are shown coupled to the wall of the elongated enclosure 19.

The luminaire 1 at one end is shown coupled to a pole 2 by an extended arm 34, and at the other end a plurality of electrical devices 55 are shown coupled to the bottom of the luminaire 1. The electrical devices 55 shown are coupled to a reduced depth portion of the elongated enclosure 19. In a different embodiment, at least one electrical device 55 can be coupled to the extended arm 34 or to another top surface of the extended arm 34 Delta luminaire 1.

The present embodiment shows the light source 25 coupled to the bottom of the elongated enclosure 19 mounted horizontally; however, the top of the luminaire 1 is shown sloping downward and away from the pole 2. The slope design's intent is to swiftly remove water from the face of the PV panel 24*k*. The angle of the slope is relatively shallow, sufficient to remove water with minimal impact on the PV panel's 24 power production efficiency.

FIG. 6D, the frontal view of the extended arm 34 of the Delta luminaire 1 is as described in FIG. 6B.

Figure 7A:
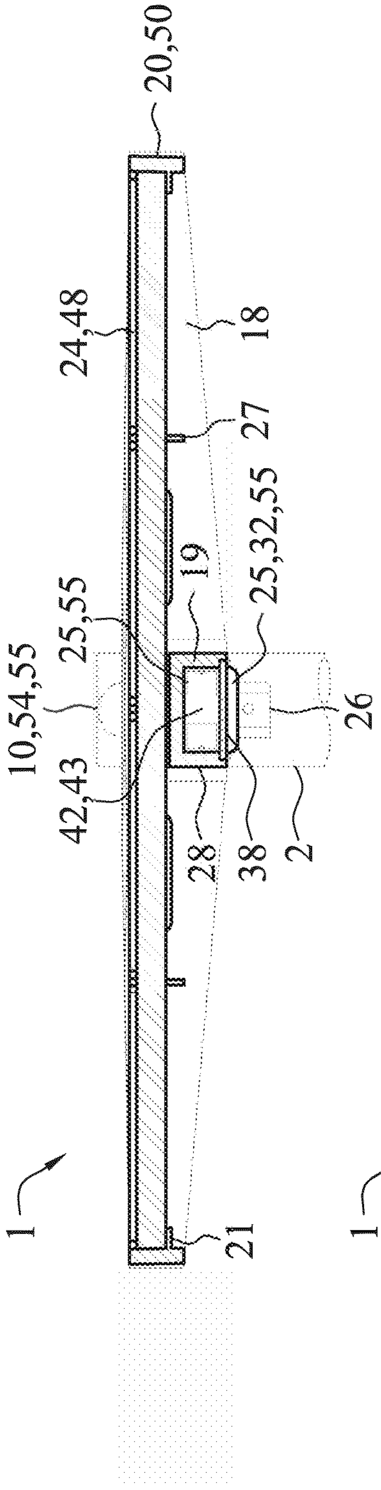
FIG. 7A shows a frontal section of the delta luminaire.
Figure 7B:
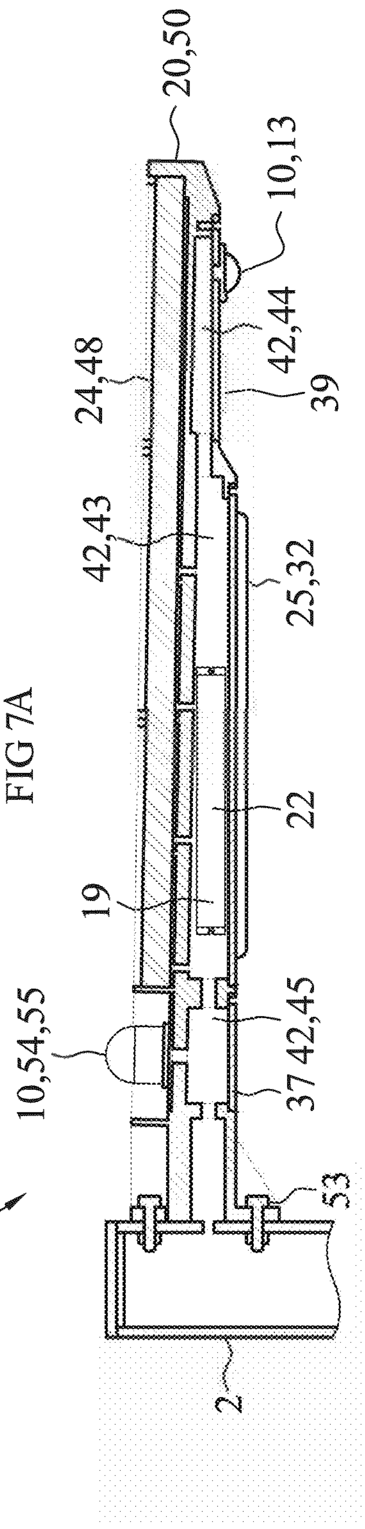
FIGS. 7B and 7C show respective longitudinal sections through the driver housing of the truncated and extended arm Delta luminaire.
Figure 7C:
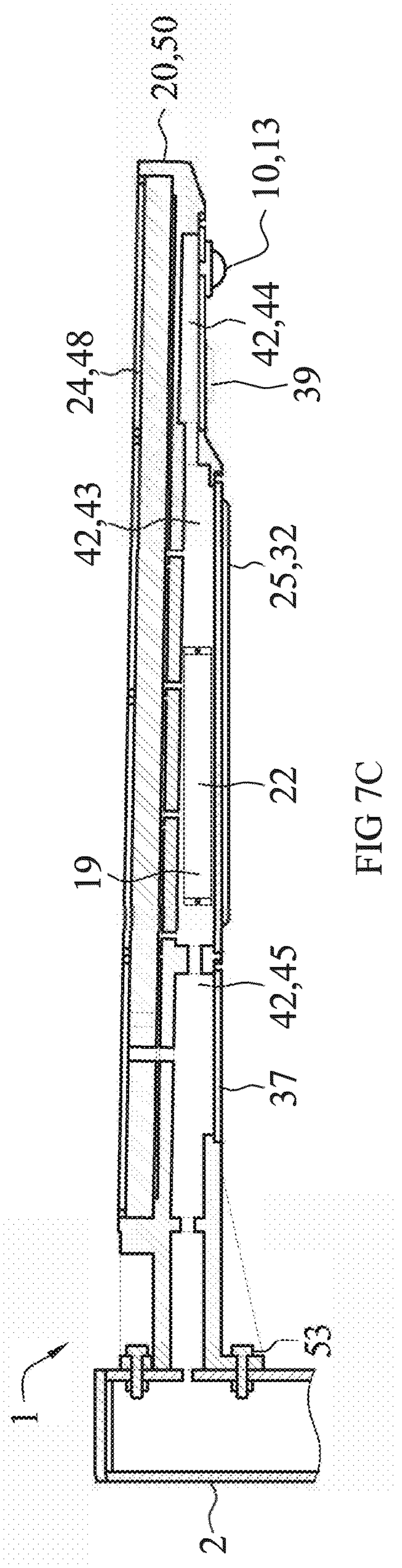

FIG. 7A shows a transverse section of the Delta luminaire 1. FIGS. 7B and 7C show longitudinal sections through the elongated enclosure 19 and the truncated arm 26 and the extended arm 34 of the Delta luminaire 1, respectively.

FIG. 7A shows a transverse section in front of and along the longest support rib 18. As shown, the rib 18 couples to the elongated enclosure 19 from both sides and extends higher than the top surface of the elongated enclosure 19. At both sides of the elongated enclosure 19, coupled heat dissipating fins 28 shown extend outwardly. Inside the elongated enclosure 19, two power supplies 22 are shown coupled to the walls. At the bottom of the elongated enclosure 19 a light source 25 with a protective optical lens 32 is shown coupled to an opening in the elongated enclosure 19 cover. A power supply cover 38 can enclose the opening and become the heat sink of the light source 25. The power supply cover 38 can be detachable and expandable, retaining additional light source 25 modules.

Long-lived electrical devices 55 can be housed inside the power supply compartment 43. The electrical devices 55 housed can include at least one of, a power supply 22, a surge protector 56 (not shown), a processor 12 (not shown), a communication device 11 (not shown), and a sensing device 10. The cross-section of the elongated enclosure 19 can have more than a single compartment 42. In at least one embodiment, line voltage and low voltage conductors 40 (not shown) are segregated and are disposed in separate compartments 42.

Receptacles 23 (not shown) configured to couple to at least one electrical device 55 can couple to the interior and exterior surfaces of the elongated enclosure 19 compartment 42 walls. The receptacles 23 can convey at least one of power and data. The Delta luminaire 1 can employ a universal receptacle 23 to couple to an array of electrical devices 55. Further, the electrical devices 55 coupled can be in part or fully communicatively coupled to at least one onboard processor 12 with resident memory and code. The processor can also be disposed inside the PV device enclosure 5 (not shown).

In at least one embodiment, at least one thermal conductor 30 that originates at the elongated enclosure's 19 interior can convey heat across and on top of at least one rib 18 to warm the back side of the PV panel 24. In an alternate embodiment shown, electrical thermal blankets 29 can be coupled to the back side of the PV panel 24 and can generate heat when at least one of, temperature drops below freezing, and moisture and/or weight pressure is sensed across the top surface of the PV panel 24.

Stiffeners 27 shown crossing the support ribs 18 add rigidity to the Delta luminaire 1 housing structure 50 with the ribs 18 shown coupled to the exterior protective frame 20. A lip 21 shown coupled to the interior face of the protective frame 20 is configured alone, or with at least a portion of a top of a rib 18 to support the weight of a coupled PV panel 24.

The PV 24 panel can have a "plug 'n play" receptacle 23 on the back side of the PV panel 24. Upon placing the PV panel 24 on the lip 21 within the protective frame 20, the receptacle 23 can electrically engage a reciprocating receptacle 23 built into the elongated enclosure's 19 top surface, thus conveying power generated by the PV panel 24 to the interior of the elongated enclosure 19.

FIGS. 7B and 7C show longitudinal sections through the elongated enclosure 19, the truncated arm 26, and the extended arm 24 of the Delta luminaire 1 respectively.

The section of the elongated enclosure 19 of the Delta luminaire 1 shows three compartments 42. The voltage and/or the power (AC/DC) flowing in/out of these compartments 42 corresponds to the electrical devices 55 coupled to the compartments' 42 walls and corresponding covers. The compartment 42 next to the arms 26, 34 can be a splice box 45. The middle power supply compartment 43 can house at least one line voltage electrical device 55 such as a power supply 22. The compartment 42 at the opposite end of the elongated enclosure's 19 splice box 45 can house and/or its device tray 39, and/or can couple to at least one low voltage electrical device 55.

A receptacle 23 shown above the elongated enclosure's 19 splice box 45 and below the PV panel 24 enables power flowing from the PV panel 24 to enter the splice box 45. The splice box 45 can have isolated compartments for DC and AC power. A plurality of through conductors 40 passing through bores 41 in the splice box 45 wall can convey low voltage, line voltage and data signal. The conductors 40 connect the Delta luminaire's 1 coupled electrical devices 55 to at least one of an electrical device 55 coupled to the pole 2, an electrical device 55 coupled to the PV enclosure 5, and is communicatively coupled to remote device/s.

At the bottom of the elongated enclosure's 19 center compartment 42, a power supply cover 38 with a light source 25 and a protective optical lens 32 is shown over the compartment's 42 opening. The power supply cover 38 can be the light source's 25 heat sink. The power supply cover 38 can be detachable and expandable, retaining additional light source 25 modules.

The present figure shows three enclosed compartments 42. The compartments' splice box cover 37, the power supply cover 38, and the device tray 39 can open to the below, exposing the elongated enclosure 19 compartments' 42 interior with its coupled electronic devices 55. The at least one splice box cover 37, power supply cover 38, and the device tray 39 can be detachable. The low voltage electrical devices 55 coupled to the device tray 39 can include at least one sensing device 10 such as a camera 13. Input from a camera 13 that is coupled to a processor 12 can then in real time process inputs and generate actionable outputs. The actionable outputs can relate to the immediate coupled luminaire/s 1 and/or an electrical device 55 coupled to the pole 2, a plurality of neighboring poles 2 with their coupled electrical devices 55, and other remote client/s.

The placement location of the electrical devices 55 in and on the Delta luminaire 1 must be weighed in relation to other neighboring electrical devices 55. For example, placing a camera 13 next to a light source 25 can be problematic if apparent glare can't be mitigated. Further, if the camera 13 is placed in proximity to a pole 2, a portion of the camera's 13 field of vision can be blocked. Furthermore, if the luminaire 1 is subject to vibration, without corrective software, the image generated by the camera 13 can be blurry. The Delta luminaire's 1 camera 13 placement is shown away from the pole 2, recessed above the light source 25, and secured to the elongated enclosure's 19 device tray 39.

Both the truncated arm 26 and the extended arm 34 Delta luminaires 1 employ an arm 26, 34 for coupling to a vertical structure. The structure can be a pole 2 or a wall surface. The present figures show an elongated fastener 5 coupling the Delta luminaire 1 to the pole 2. Both the truncated arm 26 and the extended arm 34 can be fabricated as a unitary extension of the luminaire 1. In a different embodiment, at least one Delta luminaire 1 can have a detachable arm that can couple to the luminaire 1. The arm can extend in length, as required, and may house at least one electrical device 55.

Figure 8B:
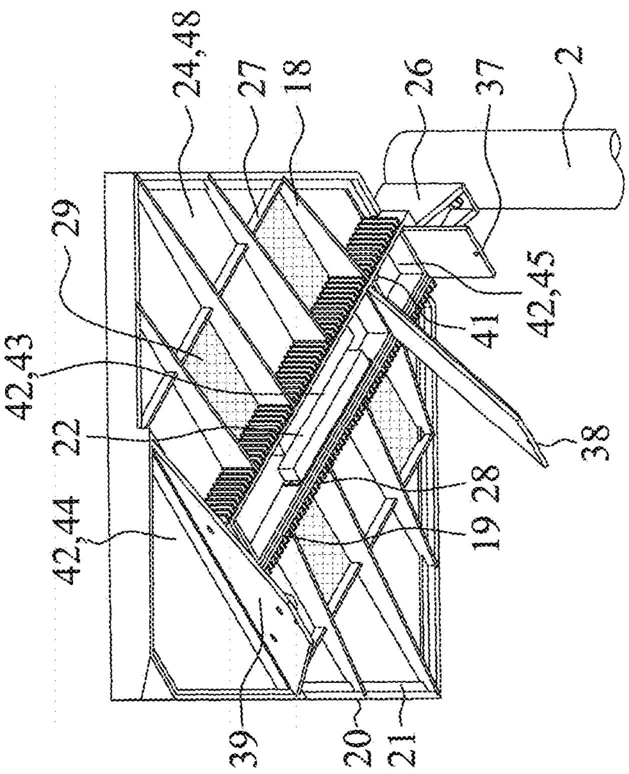
FIGS. 8A and 8B show bottom view perspectives of the Delta luminaire coupled to a pole.
Figure 8A:
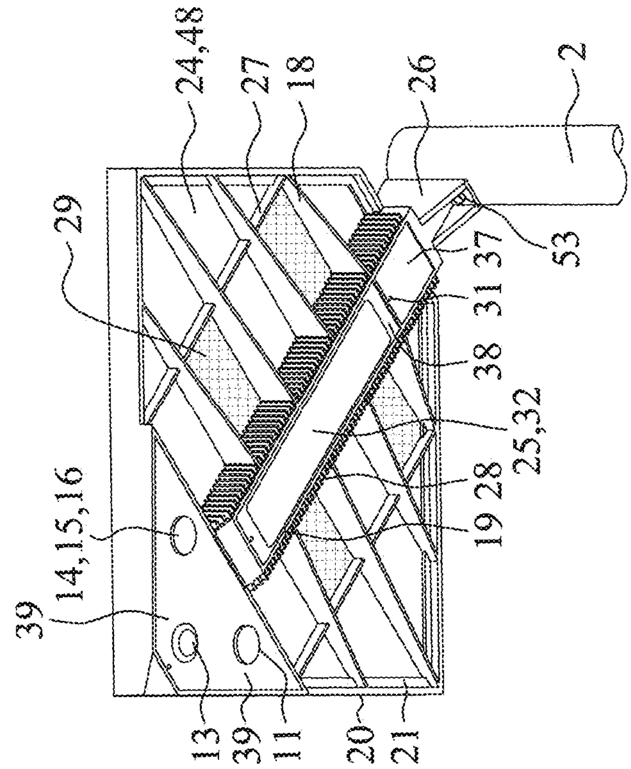

FIGS. 8A and 8B show bottom view perspectives of the truncated arm 26 Delta luminaire 1 coupled to a pole 2. FIG. 8A shows externally coupled electrical devices 55 and FIG. 8B shows the interior compartment 42, 43 of the power supply 22 of the Delta luminaire. Excluding arms 26, 34, the housing structure 50 and the electrical devices 55 coupled to the Delta luminaire 1 can be the same.

FIG. 8A shows the diagonally disposed elongated enclosure 19 extending from the center of the luminaire 1 out to form an arm 26, 34 at one end, and at the opposite end to form a compartment 42. The three covers shown enclosing the three interior compartments 43, 44, 45 of the elongated enclosure 19 are a splice box cover 37, a power supply cover 38 that is also referred to herein as the heat sin, and a device tray 39. The covers 37, 38, 39 can open to the below and are secured to the elongated enclosure 19 by a mechanical fastener 31.

At least one electrical device 55 can couple to each one of the covers 37, 38, 39. In addition, in at least one embodiment, an electrical device 55 coupled to the cover 37, 38, 39 can be detachable. The present embodiment shows at least one hinge 57 coupling from one end of the cover 37, 38, 39 to the elongated enclosure 19. In different embodiments (not shown), other coupling means can be used. The covers 37, 38, 39, secured in position, can be designed to prevent moisture from entering the interior compartments 43, 44, 45 of the elongated enclosure 19.

In the present embodiment, the covers' 37, 38, 39 exterior surfaces can be tasked with different operational aspects of the Delta luminaire 1. The splice box 45 cover 37 can be coupled to a fuse 52 and/or a surge protector 56. The cover provides access to the compartment 42 to connect/terminate the power or power and data conductors 40. At the opposite end of the elongated enclosure 19, the enlarged exterior surface of the device tray 39 enables coupling a plurality of electrical devices 55. The electrical devices 55 can include at least one of, a sensing device 10, a communication device 11, a data and/or power storing device 3, and a processing device 12.

At the center of the elongated enclosure 19, a power supply heat sink cover 38 is shown retaining the light source 25 with a protective lens 32. The cover 38 can be factory configured or configured onsite for the specific illumination needs. The power supply cover 38 can also function as a heat sink and can be designed to evenly spread the light source 25 heat across the cover's 38 surface. The cover 38 can be formed to include heat dissipating fins 28 (not shown) and the light source's 25 protective lens 32 can have a plurality of optical light pattern distributions. The cover 38 can be detachable with internal "plug 'n play" connector/s to the power supply 22. The cover's 38 surface can be expanded outwardly beyond the walls of the elongated enclosure 19 when more light output is needed.

Along the side walls of the elongated enclosure 19, heat dissipating fins 28 can be formed to accelerate heat removal from the heat generating electrical devices 55 coupled to the elongated enclosure 19. Further, the ribs 18 extending outward perpendicularly to the longitudinal axis of the elongated enclosure 19 can also help in removing the electrical devices' 55 generated heat. The ribs 18 are coupled to the elongated enclosure's 19 walls and can externally extend above the elongated enclosure's 19 top surface.

To strengthen the rigidity of the Delta luminaire 1, in at least one embodiment, stiffeners 27 can couple to the ribs 18. The stiffeners 27 and the ribs 18 that extend outwardly from the elongated enclosure 19 can couple to a protective frame 20 at the perimeter of the Delta luminaire 1. The protective frame 20 is a slimline substantially vertical structure that, in at least one embodiment, can have a continuous lip 21 on the interior wall designed to support a PV panel 24. At least two adjacent Delta luminaires can be mechanically coupled to one another by at least one mechanical fastener. In at least one embodiment the mechanical fastener/s can couple the Delta luminaires frame 20. The PV panel's 24 weight can be supported by the lip 21 alone or with the additional support of the at least one of the ribs 18 and/or the stiffeners 27. The PV panel 24 is secured to the Delta luminaire 1 housing structure 50 by mechanical fasteners 31 (not shown).

FIG. 8B shows the same worm eye view perspective of the Delta luminaire 1 as FIG. 8A, with the compartment covers 37, 38, 39 open to the below. Electrical blankets 29 are shown coupled to the bottom face of the PV panel 24. The elements' arrangement of the presently shown truncated arm 26 Delta luminaire 1 can be the same or substantially the same as the extended arm 34 Delta luminaire 1, with the exception of the arm arrangement.

The power supply cover 38 retains a light source 25 on its exterior surface. A conductor 40 can be coupled to the opposite side of the power supply cover 38 that faces the interior of the power supply compartment 43. The conductor 40 can electrically couple the light source 25 retained by the power supply cover 38 to a power supply 22 coupled inside the power supply compartment 43. The conductor 40 can be provided with a quick "plug 'n play" connector. The power supply compartment 43 is sufficiently large to accommodate at least one other power consuming electrical device 55. The electrical device 55, other than the power supply 22, can provide utility to other related and/or non-related services other than illumination.

At the roof of the power supply compartment 43, at least one venting aperture 58 can allow warmed air from inside the compartment 43 to vent to the above. Protected from exposure to water, the venting aperture 58 is disposed below the PV panel 24 and is surrounded by the frame 20 walls of the luminaire 1. The design of the Delta luminaire 1 thermal management provides for air flow across the longitudinal axis of the elongated enclosure 19 above the elongated enclosure 19. Air flowing across the through air gap 33 between the venting aperture 58 disposed at the top surface and the bottom of the PV panel 24 removes the vented heat from the power supply compartment 43.

The triangular device tray 39 provides an enlarged mounting surface area for a plurality of power consuming electrical devices 55. At least two of the coupled electrical devices 55 can have a universal receptacle 23. The receptacle 23 can provide at least one of electrical and data connectivity. An electrical device 55 coupled to the receptacle 23 can be detachable and can be coupled to a knock-out bore in the housing structure 50, based on specific location needs. Inside the device compartment 44, at least one step-down transformer 59 and a power management/controlling device 47 can be coupled.

Electrical thermal blankets 29 shown coupled to the bottom face of the PV panel 24 disposed between the ribs 18 can generate heat to melt snow or ice accumulation on top of the PV panel 24. The electrical thermal blankets 29 receive power from at least one conductor 40 disposed inside the elongated enclosure 19. Electrical thermal blankets 29 can be supplied coupled to the back side of the PV panel 24 having a "plug 'n play" power disconnect 49. The electrical thermal blankets 29 can be activated by at least one of, a sensing device 10 and an input received through a coupled communication device 11.

The ribs 18 of the housing structure 50 can also support additional electrical and/or mechanical devices coupled from below (not shown). The housing structure 50 can be made of metallic material or non-metallic material. The material can be non-corrosive and non-flammable. The housing structure can be formed by at least one of: molding, casting and 3D printing. The housing structure can be painted, anodized, and galvanized.

Figure 9A:
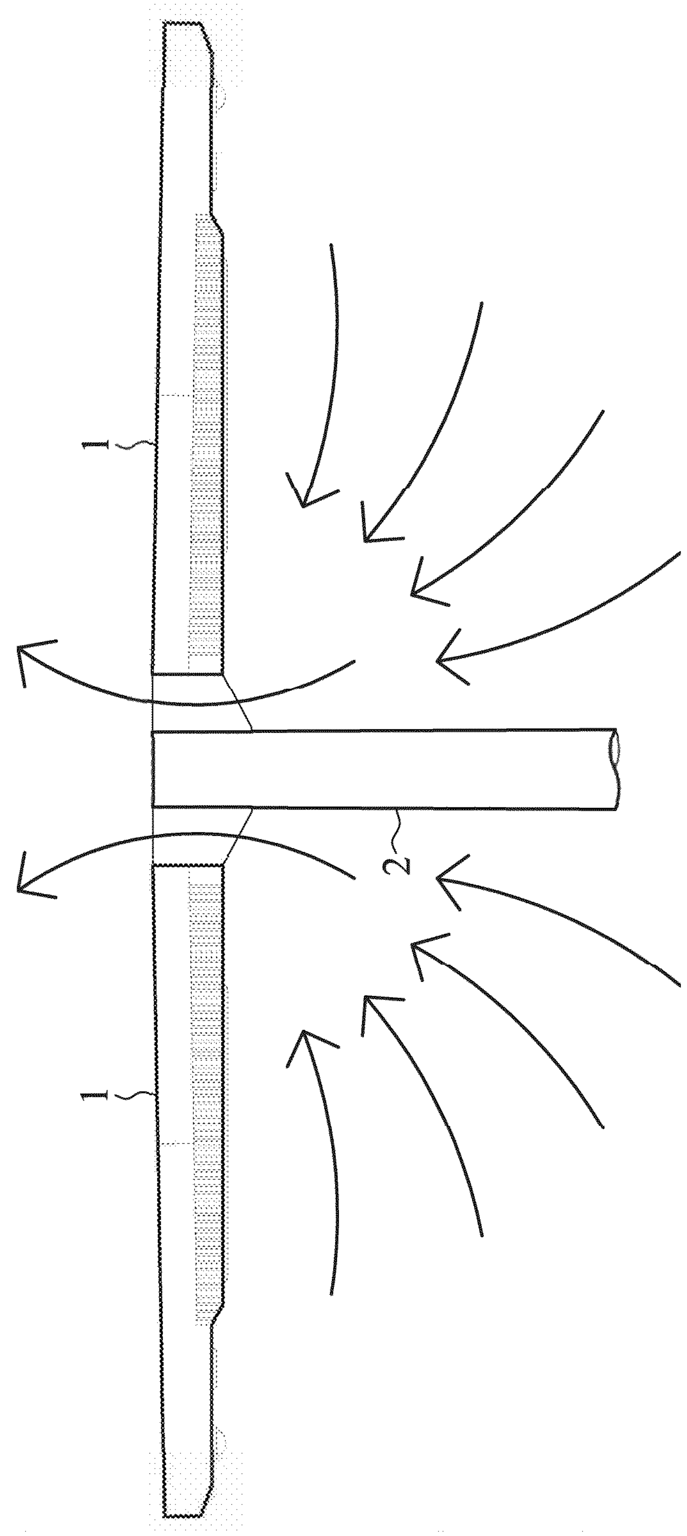
FIGS. 9A and 9B show sections of a pole with an assembly of truncated Delta luminaire coupled and transverse Delta luminaire passive cooling respectively.
Figure 9B:
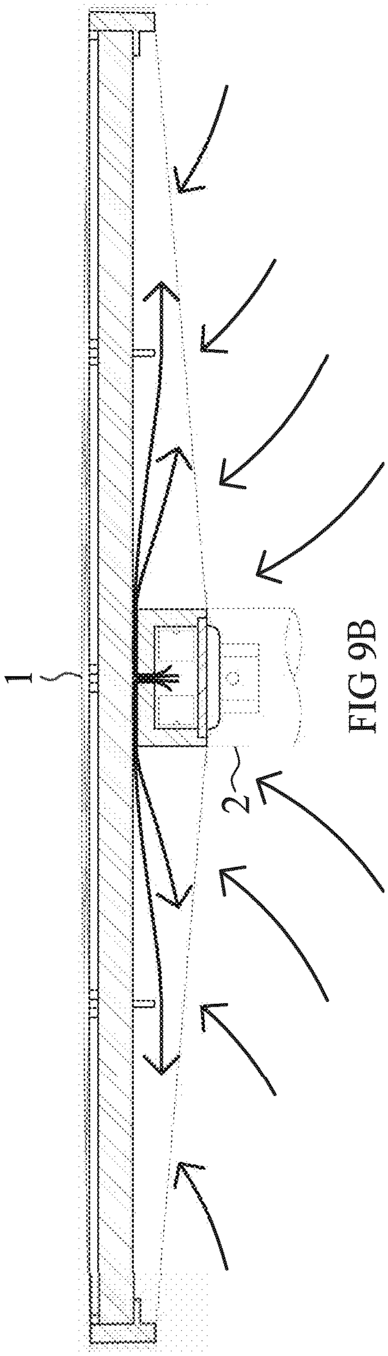

FIGS. 9A and 9B show passive cooling of the Delta luminaire 1. FIG. 9A shows a section through an assembly of Delta luminaires 1 coupled by a truncated arm 26 to a pole 2. FIG. 9B shows a transverse section of the Delta luminaire 1 cross-ventilation.

The present sections show vectors of the air flow inside and around the Delta luminaire 1.

FIG. 9A shows a section through an assembly of truncated arm 26 Delta luminaires 1 mounted on a pole 2. The luminaires' 1 assembly forms a contiguous covered area with through air openings 35 between the luminaires' 1 assembly, the pole 2, and the luminaires' arms 26. During the day the sun warms the PV panels 24 located on top of the luminaire 1. The differential in ambient temperature between the surfaces below and above the luminaire 1 assembly induces cooler air from below to rise and flow through the through air openings to the above. The cooler air flowing from below encounters elements of the housing structure 50 below, resulting in air turbulence. The air turbulence helps remove heat from the coupled electrical devices 55 through the through air openings 35 of the assembly 100.

FIG. 9B shows a transverse section through the Delta luminaire 1. The PV panel 24 is shown distally above the elongated enclosure 19 with a through air gap 33 between. At the bottom of the elongated enclosure 19, a light source 25 coupled to the power supply cover 38 is shown connected to a power supply 22. The power supply 22 is coupled to an inner wall of the elongated enclosure 19. At the roof of the elongated enclosure 19, a venting aperture 58 enables warmed air from inside the power supply compartment 43 of the elongated enclosure 19 to vent through the aperture 58 to the exterior. Cross air flowing between the top of the elongated enclosure 19 and the underside of the PV Panel 24 removes the warmed air.

It is noted that the luminaire's 1 power supply 22, is off during the daytime hours, and the electrical devices 55 are shaded during the day and are removed from direct contact with elements heated by the sun. At night the heat generated by the electrical devices 55 can freely flow to the exterior of the elongated enclosure 19, keeping the coupled electrical devices 55 cool.

Figures 10A, 10B, 10C:
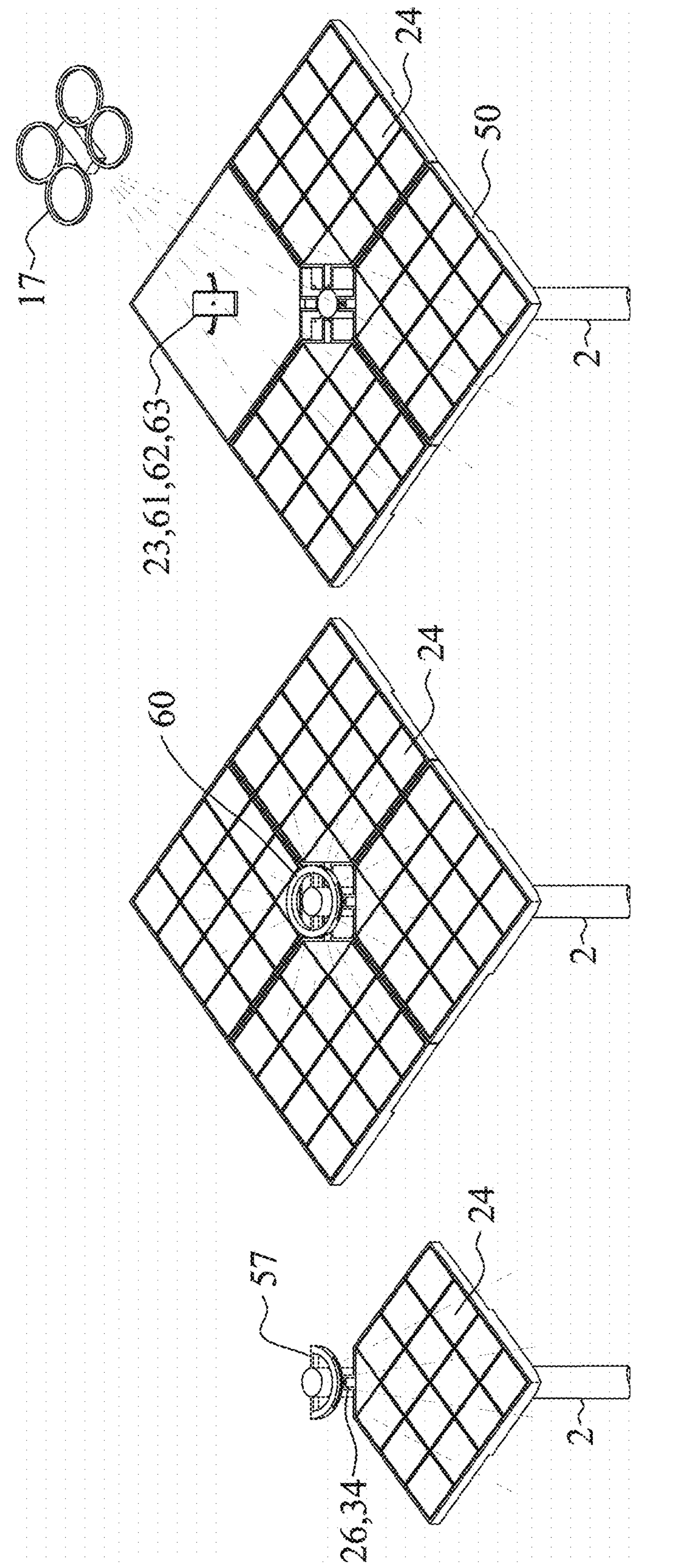
FIGS. 10A, 10B and 10C show structures to prevent dust accumulation on the Delta PV panel. The structures of FIGS. 10A and 10B are coupled to structure.

FIGS. 10A, 10B and 10C show means to prevent dust accumulation on the Delta PV panel. FIGS. 10A and 10B means are coupled to structure, and FIG. 10C is mobile.

The substantially horizontally positioned PV panels 24 are exposed to the elements. The power generation efficiency of the PV panels 24 is diminished by environmental obstructions. Aside from ice/snow accumulation on the PV panels 24, dust 65 buildup diminishes the panel's 24 power generation capacity. Where dust 65 buildup is prevalent, the Delta luminaire 1 can be coupled to at least two means of dust 65 removal from the top surface of the PV panel 24. One means is a fixed bladeless fan/blower 57,60 and the other is a UAV 17 that can blow air on the panel from above.

FIG. 10A shows a bladeless fan 57 that is coupled to a pole 2 and/or an arm 26, 34 blowing air across the top surface of the Delta PV panel 24. The bladeless fan 57 can have a horizontal or substantially aperture blows air across the PV panel 24, and is configured to direct the air in one or several directions. The direction can include a 90° single spread, back-to-back 90° spreads, a 180° single spread, a 270° single spread, and a 360° single spread.

The center of the streamed air can be aligned with the center of the elongated enclosure 19 (not shown) disposed below the PV panel 24. The bladeless fan's 57 air compressor 58 (not shown) can be distally removed from the pole 2 top and/or the arm 26, 24. In at least one embodiment, the bladeless fan 57 compressor 58 can be inside the power storage and control unit 3 PV device enclosure 5 in proximity to the ground. An air pipe 59 (not shown) originating at the compressor 58 can convey the pressurized air inside the air pipe 59 disposed inside the pole 2 to the outlet aperture/s of the bladeless fan 57.

FIG. 10B shows a centrifugal air blower 60 with fan blades that can force air laterally in at least one direction. The blower 60 coupled to the electrical motor can be placed on at least the pole 2 top with power received from inside the pole 2 from below. Both the bladeless fan's 57 and the centrifugal blower's 60 air can also be warmed to melt ice/snow accumulation.

FIG. 10C shows a UAV 17 coupled to an air fan 64 hovering over a Delta PV panel 24, blowing air over the panel's 24 surface. A UAV 17 such as the one described is described in more detail in the applicant's U.S. Pat. Nos. 9,939,143, and 10,215,351, the entire contents of each which is incorporated herein by reference. The UAV 17 can dock and receive power from a receptacle 23 on top of a Delta luminaire housing structure 50. The UAV 17 can be programmed and/or instructed by a remote signal to attend to one or several pole 2 mounted PV panels 24 on a single or a plurality of poles 2. The present figure shows the UAV 17 hovering over an assembly of four housing structure 50 panels 24 of the Delta luminaires 1. Three of the housing structures 50 are covered by Delta PV panels 24 and the fourth panel is the docking station 61 of the UAV 17 that includes a homing device 62, a receptacle 23 and a latching device 63.

The substantially horizontal PV panel/s can become a landing and possibly a roosting surface for birds. To circumvent this possibility, the Delta luminaire's pole assembly can employ deterrent devices that can couple to at least one of the pole, the arm, and the Delta luminaire. The deterrent devices can include occupancy sensor/s in combination with air and/or sound emitting devices. The sound emitting devices can be integrated with the air blowing devices and can emit sound when occupancy is sensed on at least one PV panel. The sound emitted can be localized and broadcasted in an inaudible frequency to humans.

Figures 11A, 11B, 11C, 11D:
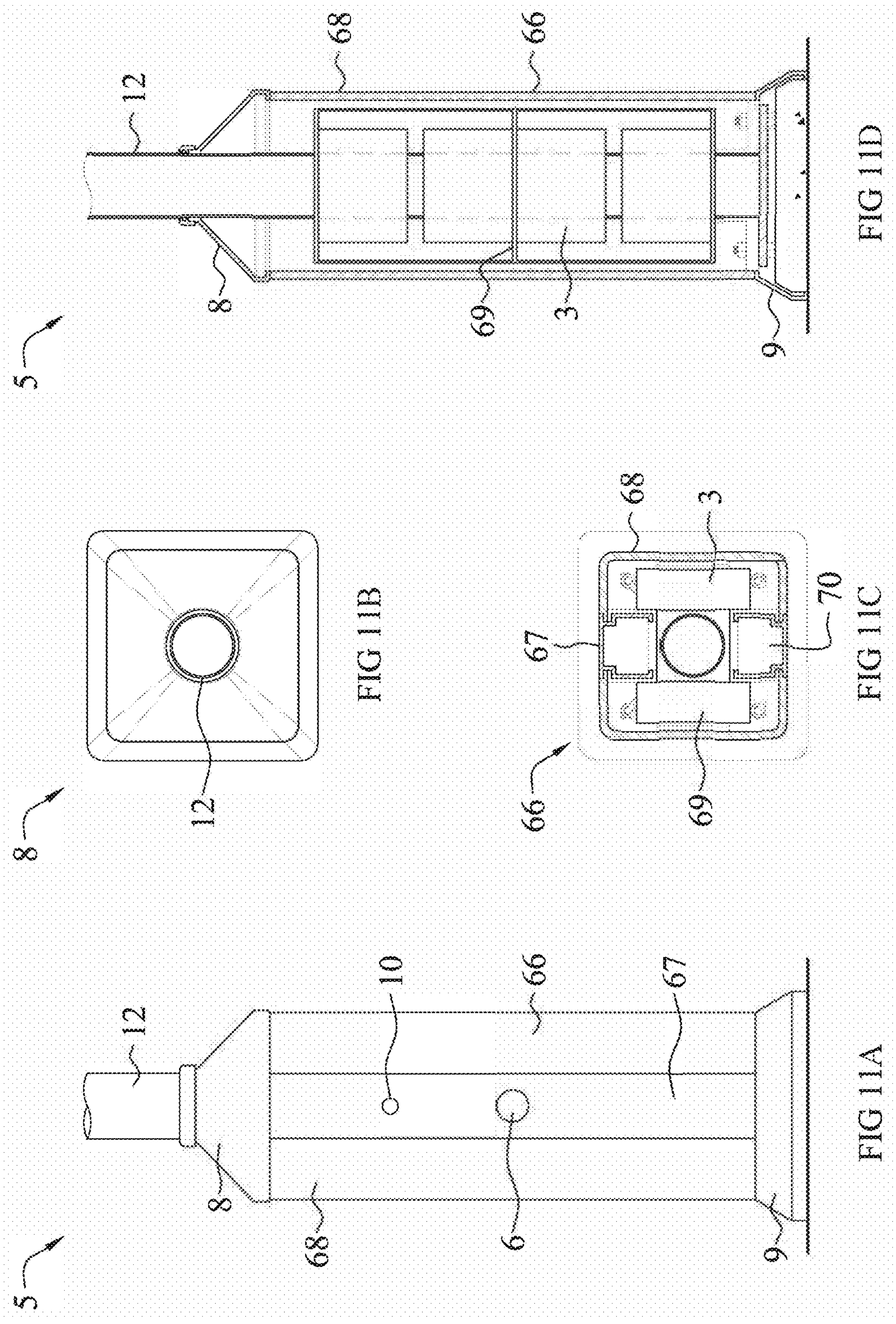
FIGS. 11A, 11B, 11C, 11D, and 11E show an exemplary ground mounted PV devices enclosure.
Figure 11E:
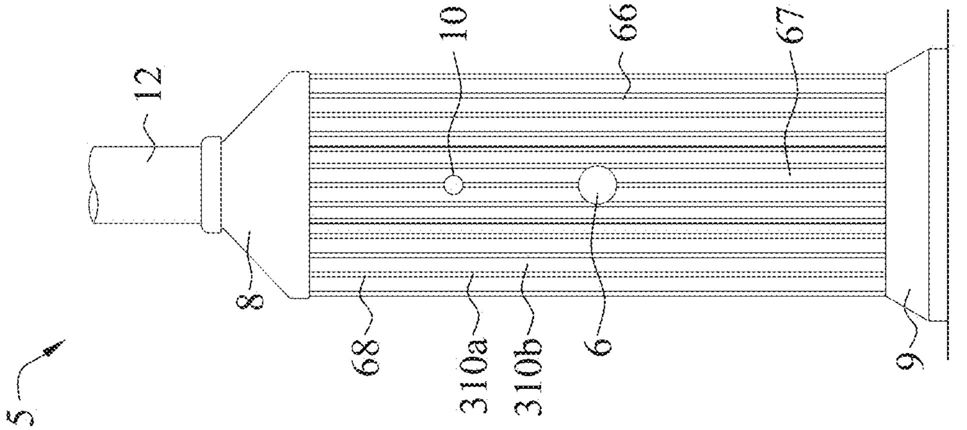

FIGS. 11A, 11B, 11C, 11D, and 11E show an exemplary ground mounted PV devices enclosure. FIGS. 11A and 11B show front and top views respectively, FIGS. 11C and 11D show a transverse section and a longitudinal section respectively, and FIG. 11E is similar to FIG. 11A but shows a textured surface with at least one of a recess 310*b* and a protrusion 310*a*.

FIG. 11A shows an elevation of the PV devices' enclosure 5. The enclosure 5 can be positioned on grade or elevated above grade. The present embodiment shows the enclosure 5 resting on grade with a pole 12 extending up from the top of the enclosure 5. The enclosure 5 can be comprised of three sections: a power storage and control unit base section 9, a power storage and control unit section 66, and a power storage and control unit cap section 8. These sections can also be referred to as the base, the middle, and the top sections of the PV devices' enclosure 5.

The enclosure's 5 primary function is to secure at least one device of the pole 12 mounted PV power generation system. The enclosure 5 is configured to be accessible for periodic servicing. In addition, at least one device with an unrelated functionality to the power generation PV system and a coupled light source can be electrically, mechanically, or electromechanically coupled to the enclosure. For example, an enclosure placed at a pedestrian crosswalk of a vehicular intersection may include a sensing device 10 and/or a mechanical device that triggers traffic light change when a pedestrian is in the vicinity.

The enclosure shown in the present figure has a base 9, a middle section 66, and a cap 8. The enclosure 5 surrounds a pole 12 with the middle section 66 length being sufficiently long to enclose at least one of, a power storage unit, a processing/control unit, a power management unit, a power conversion device, a switch, a fuse, a lightning arrester, and a surge protector (not shown). As stated above, in addition to the PV power generation devices, other related and non-related devices can be coupled to the enclosure, including at least one of, a sensing device, a communication device, and a security related device (not shown).

The base section 9 of the enclosure 5 can be secured to the pole 12, or pole-based structure. The cap section can be secured to the pole 12. The middle section 66 can have at least one structural extender 67, that extends from the base section 9 of the enclosure 5 to the cap section 8 interlocking the two sections 8, 9. Cabinet cover/s 68 then couple to the structural extender/s 67, concealing from view and protecting the devices inside the enclosure 5. At least one lock 6 can couple the cabinet cover/s 68 to the structural extender/s 67. Once locked in place, the cabinet cover/s 68 is/are configured to resist vandals and thieves. The present innovation shows a location of an electronic keyless lock 6.

The enclosure 5, at least in part, can be fabricated of metallic or non-metallic material. It can also be fabricated, at least in part, of non-corrosive, non-flammable, and non-conductive material. The enclosure's 5 exterior surface can be painted and/or can receive alphanumeric and/or graphic print. The enclosure's 5 surface can be smooth or textured and can have at least one of, a reveal and a protrusion.

FIG. 11B shows a transverse section through a pole showing the top view of the power storage and control unit cap section 8. The cap section 8 can be formed of at least one section. The cap section 8 embraces the pole 12 from all directions, preventing moisture from entering the exterior of the PV device enclosure 5. The cap section 8 can be mechanically fastened to at least one of, the pole and an element of the enclosure 5 below. The diameter and form of the cap section 8 is configured to correspond to the PV device enclosure 5 below. Therefore, the size and the form of the cap section 8 is substantially similar to that of the device enclosure 5.

FIG. 11C shows a transverse section of the PV enclosure 5 midsection 66 below the cap section 8. Two cabinets/shelves 69 are shown coupled to the pole 12. The cabinets/shelves 69 can retain at least one device of the power storage and control unit 3 of the PV power generation system. At opposing sides of the pole, cabinet covers 68 are shown coupled to the structural extender 67. The present figure shows a mechanical key 70 locking the cabinet cover 68 at one end to a structural extender 67, and at the opposite end an electronic lock 6 locking the entire PV device enclosure 5 in place.

FIG. 11D shows a vertical, longitudinal section through the PV device enclosure 5 and the pole 12. From the top down, the section shows the pole 12, the cap section 8 with the cabinet covers 68 in the middle, and the power storage and control unit base section 9 below resting on grade and secured to the concrete pole base. The cabinet/shelf 69 is shown coupled to the pole in front, concealing the pole 12. The cabinet/shelf 69 retains at least one of the PV power storage and control devices 3. The middle section 66 that houses at least one device of the PV power generation system can expand vertically and laterally to accommodate the PV power generation devices' form factor as needed. In addition, the middle section 66 can retain a plurality of nonrelated devices to the PV power generation system. At least such device can couple to the cabinet covers 68 and/or to the structural extender/s 67.

Figure 12:
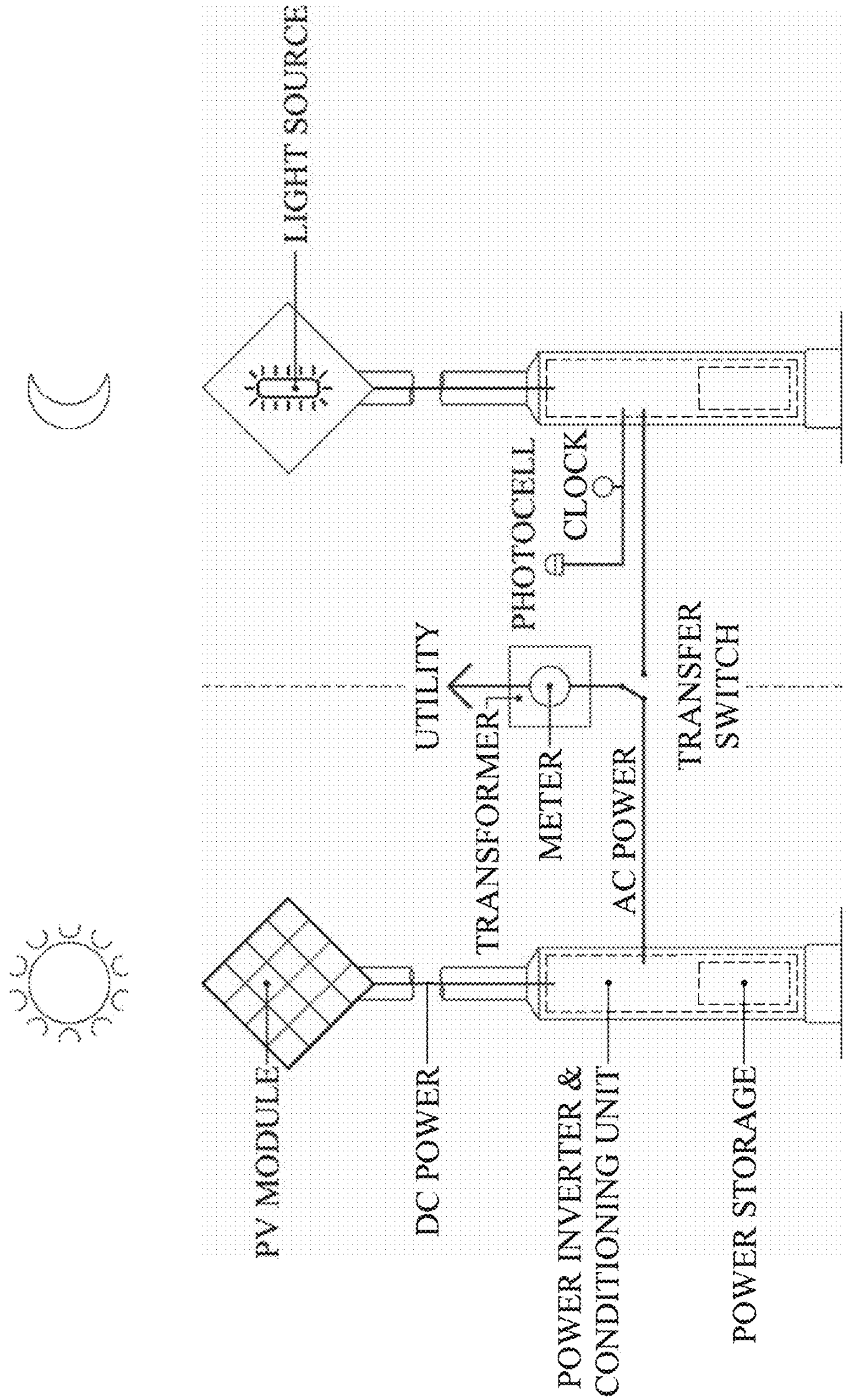
FIG. 12 shows an exemplary day and nighttime power distribution diagram of the pole mounted Delta luminaire with a coupled PV panel.

FIG. 12 shows an exemplary day and nighttime power distribution diagram of the pole 2 mounted Delta luminaire 1 with a coupled PV panel 24. The Delta luminaire is powered by at least one of, PV generated power, and power received from the grid. In applications where an ample amount of solar power is available and/or the power demand is negligible, the power source of the light source 25 can be PV generated exclusively.

On the daylight portion of the diagram, the pole 2 mounted PV panel 24 is shown receiving solar radiation and converting the radiation to DC power. The DC power flows from the PV panel 24 to a power inversion and conditioning unit that is preferably mounted below the pole's 2 mid-height. The unit shown in the present diagram is ground 36 mounted. The unit can typically include at least one power storage device 3. The power storage device's 3 storage capacity can vary based on the power management scheme of the pole 2 mounted luminaire.

The present diagram shows a power generating system with a capacity to transmit power to remote users through the grid. In at least one scenario, during daytime hours when the power storage device 3 reaches maximum capacity, the excess power can be released to the grid. The excess power can be regulated, filtered, and converted to AC power. A transfer switch can switch between the pole 2 mounted Delta luminaire 1 and/or other electrical devices 55, and external power transmission to the grid. The power transmission to the grid can be metered 60 in both directions.

Since the cost of power is lower at night, another power management scheme can transmit all or most of the PV power harvested during the daylight hours to the grid, and at night draw at least a portion of the power from the grid. This power management scheme can reduce or eliminate the need for power storage devices 3; however, it is not recommended for use in localities subject to frequent power interruptions, localities with extensive cloud cover, and/or unpredictable weather.

At dusk the luminaire's 1 light source 25 turns on by at least one of, a photocell 54, an astronomical clock 61, and by a command signal received from a remote location. The light source 25 can receive power from only one power source at a time. However, a different circuit other than the light source 25 dedicated circuit can electrify other power consuming electrical devices 55 coupled to the pole 2. At or before dawn the luminaire's 2 light switched off. The luminaire's 1 light can turn off by photocell 54, a clock, and by a command signal received from a remote location.

The power management system can include at least one processor 12 with resident memory and code that can control the operation of the light source 25. The light source 25 can be turned on, off and dimmed. Further, sensing 10 and communication 11 devices coupled to a plurality of PV powered poles 2 with a processor 12 governing at least the lighting of the pole's 2 operation can add predictive operational parameters. For example, along a straight road a pole 2 coupled to a sensing device 10 and a communication device 11 can alert and/or direct other pole 2 mounted luminaires 1 ahead to turn on when a vehicle traveling in the direction of the poles 2 is sensed.

The control methods and systems described herein may be implemented using computer programming or engineering techniques including computer software, firmware, hardware or any combination or subset thereof, wherein the technical effects may include at least control operations for a self-powered roadway luminaire using PV.

Figure 13:
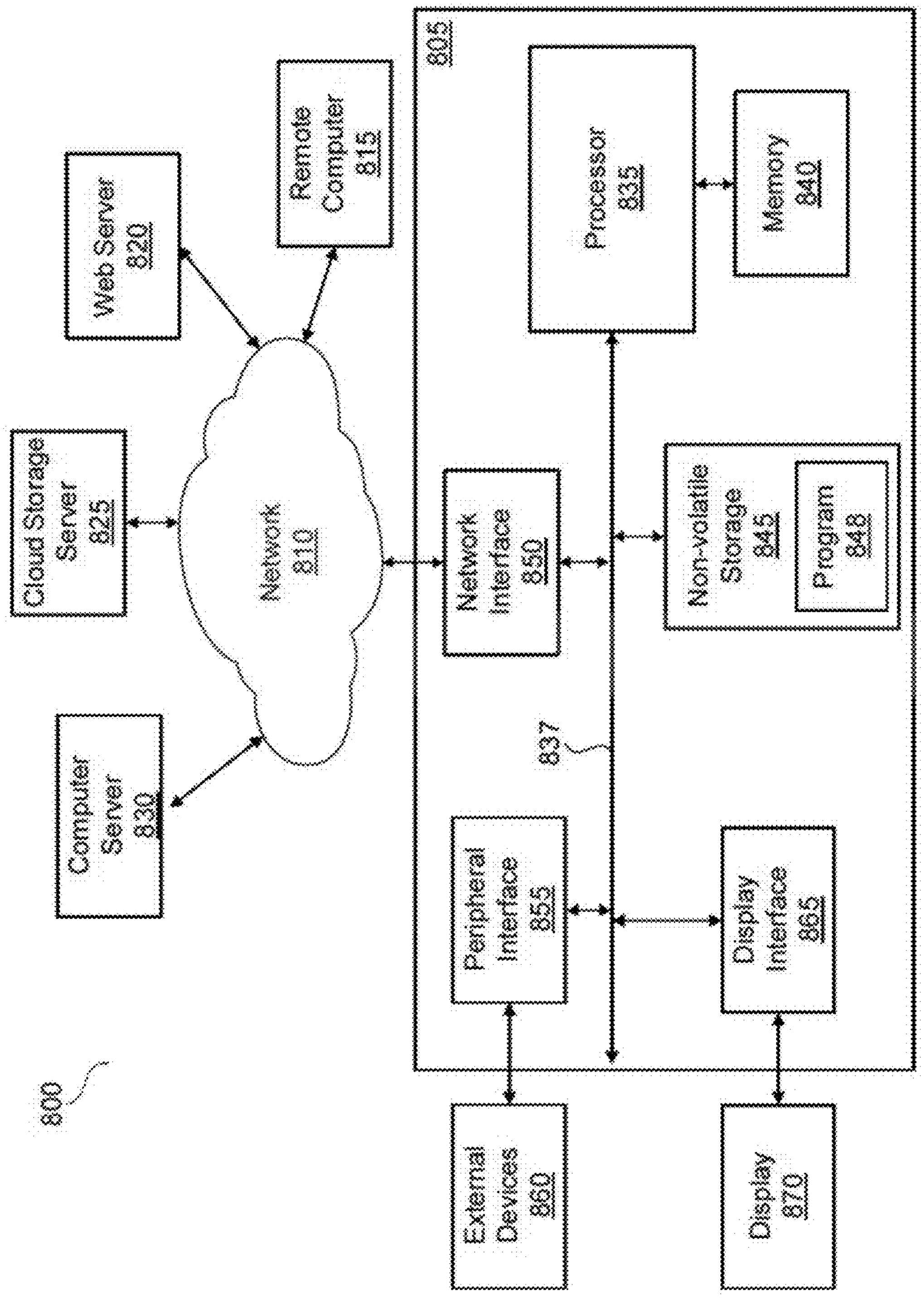
FIG. 13 is a block diagram of a computer-based system (e.g., controller and/or processor which are examples of circuitry—including fully or partially programmable circuitry and hardwired circuitry) that provide processing functionality to perform the control and analytics aspects of the present disclosure.

FIG. 13 illustrates a block diagram of a computer that may implement the various embodiments described herein.

The control aspects of the present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 13 is a functional block diagram illustrating a networked system 800 of one or more networked computers and servers. In an embodiment, the hardware and software environment illustrated in FIG. 13 may provide an exemplary platform for implementation of the software and/or methods according to the present disclosure.

Referring to FIG. 13, a networked system 800 may include, but is not limited to, computer 805, network 810, remote computer 815, web server 820, cloud storage server 825 and computer server 830. In some embodiments, multiple instances of one or more of the functional blocks illustrated in FIG. 13 may be employed.

Additional detail of computer 805 is shown in FIG. 13. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

Circuitry as used in the present application can be defined as one or more of the following: an electronic component (such as a semiconductor device), multiple electronic components that are directly connected to one another or interconnected via electronic communications, a computer, a network of computer devices, a remote computer, a web server, a cloud storage server, a computer server. For example, each of the one or more of the computer, the remote computer, the web server, the cloud storage server, and the computer server can be encompassed by or may include the circuitry as a component(s) thereof. In some embodiments, multiple instances of one or more of these components may be employed, wherein each of the multiple instances of the one or more of these components are also encompassed by or include circuitry. In some embodiments, the circuitry represented by the networked system may include a serverless computing system corresponding to a virtualized set of hardware resources. The circuitry represented by the computer may be a personal computer (PC), a desktop computer, a laptop computer, a tablet computer, a netbook computer, a personal digital assistant (PDA), a smart phone, or any other programmable electronic device capable of communicating with other devices on the network. The circuitry may be a general purpose computer, special purpose computer, or other programmable apparatus as described herein that includes one or more processors. Each processor may be one or more single or multi-chip microprocessors. Processors are considered processing circuitry or circuitry as they include transistors and other circuitry therein. The circuitry may implement the systems and methods described in this disclosure based on computer-readable program instructions provided to the one or more processors (and/or one or more cores within a processor) of one or more of the general purpose computer, special purpose computer, or other programmable apparatus described herein to produce a machine, such that the instructions, which execute via the one or more processors of the programmable apparatus that is encompassed by or includes the circuitry, create a system for implementing the functions specified in the flow diagrams and block diagrams in the present disclosure.

Alternatively, the circuitry may be a preprogrammed structure, such as a programmable logic device, application specific integrated circuit, or the like, and is/are considered circuitry regardless if used in isolation or in combination with other circuitry that is programmable, or preprogrammed.

Obviously, numerous modifications and variations of the present disclosure are possible in light of the above teachings. It is therefore to be understood that within the scope of the appended claims, the disclosure may be practiced otherwise than as specifically described herein.

ELEMENT LIST

1. Delta Luminaire
2. Pole
3. Power Storage & Control Unit
4. Inverter
5. PV Devices Enclosure
6. Lock
7. Concrete Base
8. Power Storage & Control Unit Cap
9. Power Storage & Control Unit base

10. Sensing Device
11. Communication Device
12. Processing Device
13. Camera
14. Speaker/Mic
15. Air Quality Sensor
16. Radiation Sensor
17. UAV
18. Rib
19. Elongated Enclosure
20. Frame
21. Lip
22. Power Supply
23. Receptacle
24. Photovoltaic (PV) Panel
25. Light Source
26. Truncated Arm
27. Stiffener
28. Heat Dissipating Fins
29. Electrical Thermal Blanket/Pad
30. Thermal Conductor
31. Mechanical Fastener
32. Lens
33. Through Air Gap
34. Extended Arm
35. Through Air Opening
36. Ground
37. Splice Box Cover
38. Power Supply Cover/Heatsink
39. Device Tray
40. Power/Data Conductor
41. Bore
42. Compartment
43. Power Supply Compartment
44. Sensing Device Compartment
45. Splice Box
46. Battery
47. Power Management Controller
48. PV Sub-panel
49. Power Disconnect
50. Luminaire Housing Structure
51. Heat Reflecting/Non-conductive Pad
52. Fuse
53. Elongated Fastener
54. Photocell
55. Electrical Device
56. Surge Protector
57. Bladeless Fan
58. Compressor
59. Air Pipe
60. Centrifugal Blower
61. Docking Station
62. Homing Device
63. Latching Device
64. Air fan
65. Dust
66. Power Storage/Control Unit Section
67. Enclosure Extender
68. Cabinet Cover/s
69. Cabinet/Shelf
70. Mechanical Key
100. Pole assembly

The invention claimed is:

1. An integrated self-powered luminaire comprising: a luminaire housing structure having a protective frame with ribs and an arm with an elongated enclosure, the arm is mechanically attachable to a pole structure, the protective frame being substantially square and horizontal so as to support scalability; a light source that is coupled to the arm elongated enclosure;

and a photovoltaic panel that is coupled to the luminaire housing structure, wherein the arm extends diagonally below and diagonally across the substantially square protective frame and radially away from the pole, perpendicularly oriented to the arm, the ribs respectively extend outward and couple to vertical walls of the protective frame, the vertical walls of the protective frame define an external perimeter of the luminaire housing structure, at a top of the luminaire housing structure, the photovoltaic panel couples to and is supported at least at an outermost periphery portion by at least one of a lip that extends inwardly from an interior face of one of the vertical walls and at least one of the ribs, the light source is coupled to a down facing surface of the arm elongated enclosure, an outer edge of the photovoltaic panel substantially matches a majority of a perimeter defined by interior faces of the vertical walls of the protective frame, an outer face of at least one of the vertical walls of the protective frame is straight and configured to be positioned alongside a matching face of another photovoltaic panel, and air from below the integrated self-powered luminaire is induced to flow upwardly via a through-air opening adjacent to the arm and between the pole structure and the protective frame.

2. The integrated self-powered luminaire of claim 1, further comprising:

the pole structure, wherein the pole structure being vertically oriented and the luminaire housing structure is attached closer to a top end of the pole structure than an opposite end of the pole structure that is attached to ground.

3. The integrated self-powered luminaire of claim 1, wherein air is free to flow through an air gap located between a top of the elongated enclosure and a bottom face of the photovoltaic panel.

4. The integrated self-powered luminaire of claim 1, further comprising a cover that removably encloses at least one compartment inside the elongated enclosure.

5. The integrated self-powered luminaire of claim 1, further comprising at least one electrical device that is coupled to a removable cover of an elongated enclosure compartment.

6. The integrated self-powered luminaire of claim 5, wherein through at least one bore in a wall of the elongated enclosure compartment, power and/or data flows via a conductor to and/or from the electrical device.

7. The integrated self-powered luminaire of claim 1, wherein the photovoltaic panel coupled to the luminaire housing structure is substantially horizontally positioned.

8. The integrated self-powered luminaire of claim 1, wherein the luminaire housing structure has a shape of at least one of a square, and a square with a truncated corner.

9. The integrated self-powered luminaire of claim 1, wherein the arm is at least one of an integral arm and a coupled arm.

10. An assembly of integrated self-powered luminaires coupled to a pole, the assembly comprising: a first integrated self-powered luminaire comprising a luminaire housing structure having a protective frame with ribs and an arm with an elongated enclosure, the arm is mechanically attachable to the pole, the protective frame being substantially square and horizontal so as to support scalability, a light source that is coupled to the elongated enclosure, a photovoltaic panel that is coupled to the luminaire housing structure, at least one additional electrical device other than the light source and the photovoltaic panel disposed within the elongated enclosure, wherein the arm extends below and diagonally across the substantially square protective frame and radially away from the pole, perpendicularly oriented to the arm, the ribs respectively extend outward and couple to vertical walls of the protective frame, the vertical walls of the protective frame define an external perimeter of the luminaire housing structure, the ribs are exposed so as to allow air to flow freely from below and next to sides of the ribs, upper sides of the ribs support a bottom surface of the photovoltaic panel, at a top of the luminaire housing structure, the photovoltaic panel is supported by at least one of a lip that extends inwardly from one of the vertical walls and at least one of the ribs, the light source is coupled to a down facing surface of the elongated enclosure; a second integrated self-powered luminaire, an external face of a vertical wall of a second protective frame of the second integrated self-powered luminaire runs along an external face of of one of the vertical walls of the first protective frame; wherein a combined outer periphery of the first integrated self-powered luminaire, the second integrated self-powered luminaire, a third integrated self-powered luminaire, and a fourth integrated self-powered luminaire is square in shape, and an inner periphery of each of the first integrated self-powered luminaire, the second integrated self-powered luminaire, the third integrated self-powered luminaire, and the fourth integrated self-powered luminaire are spaced apart from the pole by through air-openings such that under a condition an ambient temperature above the photovoltaic panel exceeds a temperature directly below the assembly, an air stream from below flows through the through air-openings so as to cool electrical devices coupled to the luminaire housing structure.

11. The assembly of claim 10, wherein the electrical devices are cooled by a chimney effect.

12. The assembly of claim 10, wherein the electrical devices are cooled by a Venturi effect.

13. The assembly of claim 10, wherein a mechanical strength of the protective frame is sufficient to support another photovoltaic panel that has a surface area greater than that for the photovoltaic panel and additional light sources.

14. The assembly of claim 10, wherein cross air flows between a top on the elongated enclosure and a bottom face of the photovoltaic panel so as to cool electrical devices coupled to the luminaire housing structure.

15. An integrated self-powered luminaire comprising: a luminaire housing structure having a protective frame with ribs and an elongated enclosure that is mechanically attachable to a pole structure via an arm, the protective frame being substantially square and horizontal; a light source that is coupled to the housing; a power supply; a conductor; a photovoltaic panel; and a power storage device, wherein the elongated enclosure extends diagonally below the substantially square protective frame toward an opposite corner of the protective frame with respect to the arm, perpendicularly oriented to the arm, the ribs respectively extend outward and couple to vertical walls of the protective frame, the vertical walls of the protective frame define an external perimeter of the luminaire housing structure and provide a physical barrier to protect at least outermost edge portions of the photovoltaic panel, the elongated enclosure includes an internal compartment that retains the power supply, the elongated enclosure having a cover that is openable from a side that faces the ground, and an external bottom surface of the cover that retains the light source that emits light downwardly; the conductor is disposed through at least one bore in a wall of the internal compartment to provide power and/or data to and/or from an electrical device coupled to the luminaire housing structure; at a top of the luminaire housing structure, at least a portion of an outer periphery of the photovoltaic panel is supported by at least one of a lip and one of the ribs, the arm of the elongated enclosure mechanically supports the weight of the photovoltaic panel and other coupled electrical devices that are coupled to the luminaire housing structure, and during daytime hours, power generated by the photovoltaic panel flows to at least one of, the power storage device and to a power grid, and at night, at least a portion of the power stored by the power storage device flows to the coupled light source of the self-powered luminaire so as to illuminate a surface below.

16. The integrated self-powered luminaire of claim 15, further comprising at least one of a sensor and a communication device coupled to the luminaire housing structure.

17. The integrated self-powered luminaire of claim 15, wherein a top surface of the luminaire housing structure is an electrified unmanned ariel vehicle (UAV) launching pad.

18. The integrated self-powered luminaire of claim 15, further comprising a processor with resident memory and code, the processor being coupled to the elongated enclosure.

19. The integrated self-powered luminaire of claim 15, cover of the elongated enclosure is a detachable cover.

20. The integrated self-powered luminaire of claim 19, further comprising a power consuming device that is coupled to the detachable cover.

21. The integrated self-powered luminaire of claim 15, further comprising an electrical heat generating device coupled to a bottom of the photovoltaic panel that generates heat to melt ice and/or snow.

22. The integrated self-powered luminaire of claim 15, wherein electrical devices coupled to the luminaire housing structure are longer life devices than electrical devices electrically coupled to the pole below a mid-height of the pole.

23. An integrated self-powered luminaire comprising: a pole; a luminaire housing structure having a protective frame with ribs and an arm with an elongated enclosure, the arm is mechanically attachable to the pole, the protective frame being substantially square and horizontal so as to support scalability; a light source that is coupled to the elongated enclosure; and a photovoltaic panel that is coupled to the luminaire housing structure, wherein the arm extends below and diagonally across the substantially square protective frame and radially away from the pole, perpendicularly oriented to the arm, the ribs respectively extend outward to couple to vertical walls of the protective frame, the vertical walls of the protective frame define an external perimeter of the luminaire housing structure, at a top of the luminaire housing structure, the photovoltaic panel is supported by at least one of a lip that extends inwardly from one of the vertical walls and at least one of the ribs, the light source is coupled to a down facing surface of the elongated enclosure, a size of the photovoltaic panel is set to support an electrical power demand of the light sources coupled to the elongated enclosure; an interior of the elongated enclosure is accessible from below the luminaire housing structure with at least one device coupled to the interior of the elongated enclosure and in communication with at least one of the PV panel and the light source, and a vertical height and/or the lateral width of the elongated enclosure is scalable to accommodate form factors of various photovoltaic power generation devices that may be accommodated therein.

24. The integrated self-powered luminaire of claim 23, wherein the elongated enclosure includes at least one of a mechanical and an electronic lock.

25. The integrated self-powered luminaire of claim 24, wherein the at least one of the mechanical and electrical lock is the electronic lock, the electronic lock being a keyless lock.

26. The integrated self-powered luminaire of claim 23, further comprising at least one device that is unrelated to the light source that is coupled to at least one of the elongated enclosure and the pole.

27. The integrated self-powered luminaire of claim 23, wherein a form of the elongated enclosure varies with at least one exterior surface having at least one of a recess and a protrusion.

28. The integrated self-powered luminaire of claim 23, wherein the elongated enclosure encloses at least one device cabinet/shelf coupled to the pole.

29. The integrated self-powered luminaire of claim 23, is coupled to another integrated self-powered luminaire having the same structure as the integrated self-powered luminaire of claim 23.

* * * * *